United States Patent [19]
Yamada et al.

[11] Patent Number: 6,031,554
[45] Date of Patent: Feb. 29, 2000

[54] HALFTONE RECORDING METHOD AND APPARATUS

[75] Inventors: Keiki Yamada; Masatoshi Takahashi, both of Kanagawa, Japan

[73] Assignee: Mitsubishi Denki Kabushiki Kaisha, Tokyo, Japan

[21] Appl. No.: 08/480,768

[22] Filed: Jun. 7, 1995

[30] Foreign Application Priority Data

Mar. 14, 1995 [JP] Japan .................................. 7-054155

[51] Int. Cl.⁷ .................................. B41J 2/52; B41J 2/36
[52] U.S. Cl. .......................................... 347/183; 347/184
[58] Field of Search .................................. 347/183, 184, 347/180, 181, 182; 400/120.07; 358/298

[56] References Cited

U.S. PATENT DOCUMENTS

| | | |
|---|---|---|
| 4,368,491 | 1/1983 | Saito . |
| 4,704,617 | 11/1987 | Sato et al. . |
| 4,746,941 | 5/1988 | Pham et al. . |
| 4,779,102 | 10/1988 | Sasaki ..................................... 347/183 |
| 4,894,712 | 1/1990 | Katsukawa .............................. 347/183 |
| 4,910,528 | 3/1990 | Firl et al. . |
| 4,952,085 | 8/1990 | Rein ....................................... 347/183 |
| 5,126,757 | 6/1992 | Yamada . |
| 5,232,294 | 8/1993 | Inui . |
| 5,363,125 | 11/1994 | Inui . |

FOREIGN PATENT DOCUMENTS

| | | |
|---|---|---|
| 0130419 A2 | 9/1985 | European Pat. Off. . |
| 0452928 | 10/1991 | European Pat. Off. . |
| 3731278 A1 | 7/1988 | Germany . |
| 60-9271 | 1/1985 | Japan . |
| 63-018865 | 1/1988 | Japan . |
| 63-199657 | 8/1988 | Japan . |

OTHER PUBLICATIONS

"Development of High Definition Video Copy Equipment" proceeding of the '86 General National Conference of . . . No. 1,276 (Yasuro Hori, Nobuo Abe, Yasuaki Suzuki Tohru Takei and Junich Matsuno.

Patent Abstracts of Japan, Jul. 29, 1992, JP 04 207664 A, Matsushita Electric Ind Co Ltd.

Patent Abstracts of Japan, Oct. 20, 1983, JP 58 179057 A, Konishiroku Photo Ind Co Ltd.

Patent Abstracts of Japan, Aug. 27, 1984, JP 59 149460 A, Canon Inc.

*Primary Examiner*—Huan Tran

[57] ABSTRACT

A recording sheet is fed two times for recording of one line. Two recording operations corresponding to the respective sheet feeding operations are performed in a dispersive manner based on gradation data that are different for the respective sheet feeding operations. For example, binary data for the first and second recording operations are generated by comparing the gradation data with odd-numbered and even-numbered gradation reference values, respectively.

16 Claims, 20 Drawing Sheets

|  | GRADATION REFERENCE VALUE | | | | | | | | | |
|---|---|---|---|---|---|---|---|---|---|---|
|  | 1 | 2 | 3 | 4 | 5 | 6 | | | | 255 |
| 256-VALUE DATA 0 | 0 | 0 | 0 | 0 | 0 | 0 | | | | 0 |
| 1 | 1 | 0 | 0 | 0 | 0 | 0 | | | | 0 |
| 2 | 1 | 1 | 0 | 0 | 0 | 0 | | | | 0 |
| 3 | 1 | 1 | 1 | 0 | 0 | 0 | | | | 0 |
| 4 | 1 | 1 | 1 | 1 | 0 | 0 | | | | 0 |
| 5 | 1 | 1 | 1 | 1 | 1 | 0 | | | | 0 |
| 6 | 1 | 1 | 1 | 1 | 1 | 1 | | | | 0 |
| 255 | 1 | 1 | 1 | 1 | 1 | 1 | 1 | 1 | 1 | 1 |

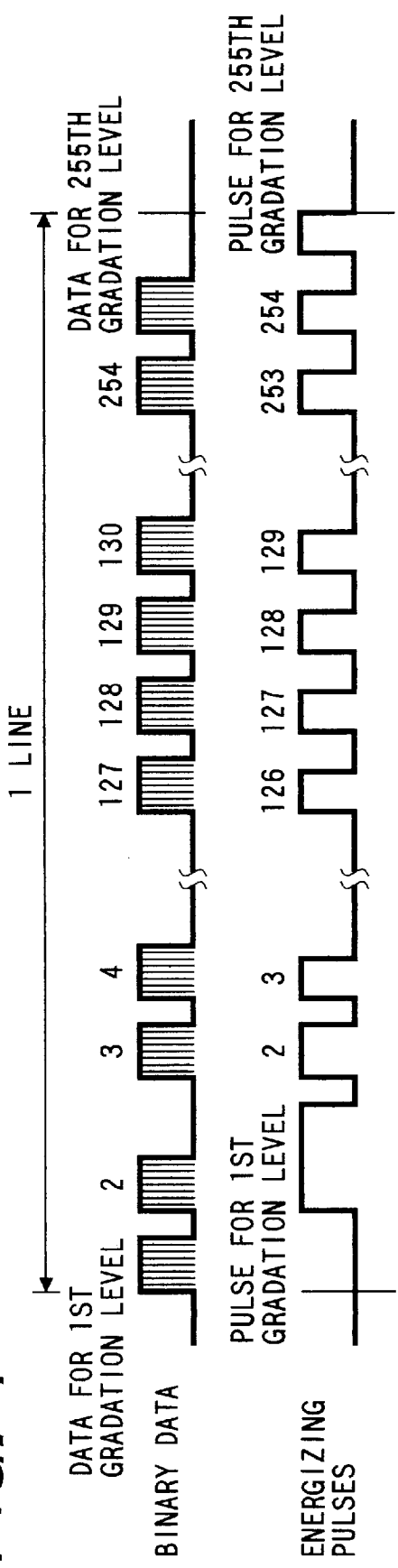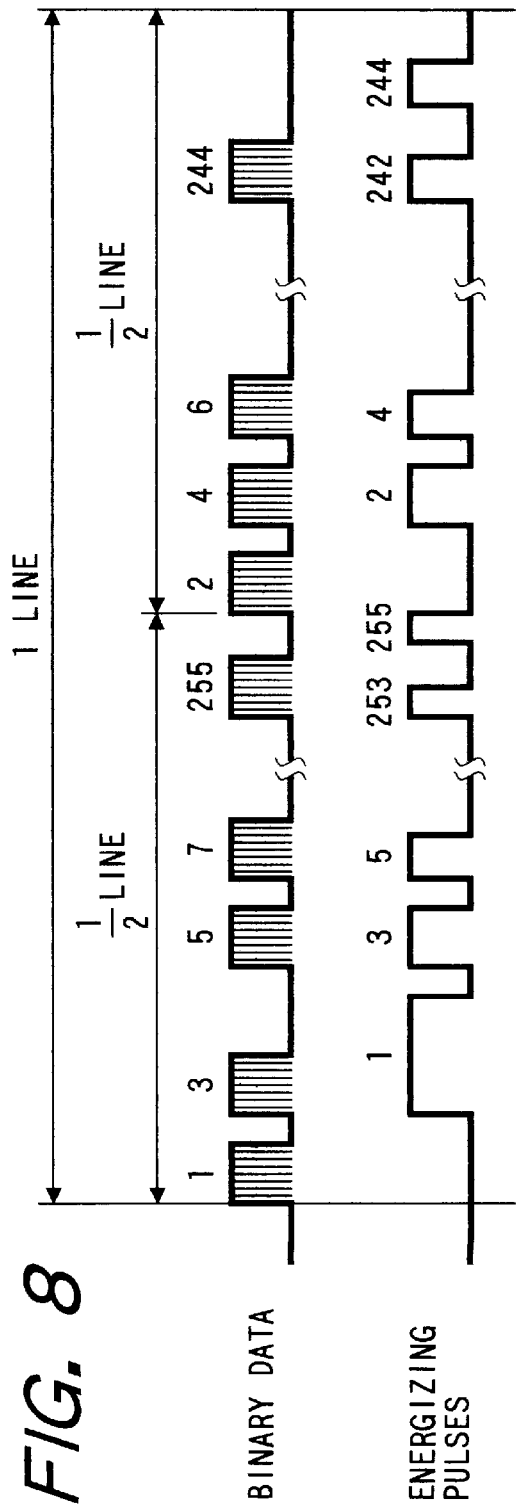

| GRADATION REFERENCE VALUE | WIDTH OF ENERGIZING PULSES |
|---|---|
| 1 | 20 |
| 2 | 10 |
| 3 | 8 |
| 4 | 7 |
| 5 | 6 |
| 6 | 5 |
| 7 | 5 |
| ⋮ | ⋮ |
| 254 | 6 |
| 255 | 5 |

| INPUT GRADATION DATA | ENERGIZING PULSE LEVEL |
|---|---|
| 0 | 0 |
| 1 | 20 |
| 2 | 32 |
| 3 | 41 |
| ⋮ | ⋮ |
| 127 | 150 |
| 128 | 151 |
| ⋮ | ⋮ |
| 253 | 292 |
| 254 | 294 |
| 255 | 298 |

| ENERGIZING PULSE LEVEL | ENERGIZING PULSE p | AUXILIARY ENERGIZING PULSE q |
|---|---|---|
| 0 | 0 | 0 |
| 1 | 0 | 1 |
| 2 | 1 | 0 |
| 3 | 1 | 1 |
| 4 | 2 | 0 |
| 5 | 2 | 1 |
| 6 | 3 | 0 |
| 7 | 3 | 1 |
| 8 | 4 | 0 |
| 9 | 4 | 1 |
| 10 | 5 | 0 |
| 11 | 5 | 1 |
| 12 | 6 | 0 |
| 13 | 6 | 1 |
| 14 | 7 | 0 |
| ⋮ | ⋮ | ⋮ |
| 254 | 127 | 0 |
| 255 | 127 | 1 |
| ⋮ | ⋮ | ⋮ |
| 298 | 149 | 0 |

| ENERGIZING PULSE LEVEL | ENERGIZING PULSE p | AUXILIARY ENERGIZING PULSE q |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |
| 12 | 3 | 0 |
| 13 | 3 | 1 |
| 14 | 3 | 2 |
| ⋮ | ⋮ | ⋮ |
| 254 | 63 | 2 |
| 255 | 63 | 3 |
| ⋮ | ⋮ | ⋮ |
| 298 | 74 | 2 |

HALFTONE RECORDING METHOD AND APPARATUS

BACKGROUND OF THE INVENTION

1. Field of the Invention

The present invention relates to a halftone recording method and apparatus for performing recording on a recording sheet at a plurality of gradation levels while moving the recording sheet.

2. Description of the Prior Art

Among many recording apparatuses for performing halftone recording, a halftone recording apparatus using a thermal recording head such as a thermal head is widely applied to various recording apparatuses such as a printer, a copier, and a facsimile machine because of its advantages of simple mechanism, high reliability, superior maintainability, etc. The halftone recording apparatus using a thermal recording head performs recording of n gradation levels (n: integer of 2 or larger) on a recording sheet by thermally transferring ink of an ink sheet of a melting type, a sublimation type, or some other type.

As described above, to perform halftone recording, i.e., recording of n gradation levels (n is 64, for instance), a thermal transfer recording method is employed which uses a melting or sublimation type ink sheet. In this thermal transfer recording method, desired recording is performed by transferring, to a prescribed recording sheet, pigment or dye ink of a quantity that corresponds to a heat quantity generated by electric energy that is applied to each of heating resistors constituting a thermal recording head. The heat quantity of each heating element is controlled by the number or duration of pulses applied to it.

The above conventional recording method is described, for instance, in Japanese Unexamined Patent Publication No. Sho. 60-9271. FIG. 35 is a waveform diagram showing energizing pulses SB applied to each of the heating resistors that constitute the thermal head in the conventional halftone recording method under consideration. In FIG. 35, $t_W$ denotes a width of the pulse SB; $t_P$, a repetition period of the pulse SB; and N (3 in this example), the number of pulses SB. The number N of pulses SB is preset for the density of each gradation level.

By applying, to each heating resistor, energizing pulses SB of a number corresponding to a desired gradation level in the above manner, ink of a quantity corresponding to energy, i.e., the number of pulses is transferred, to thereby effect halftone recording of each density.

Usually, recording of one line is performed by applying, en bloc or in a divided manner, energizing pulses to the respective heating resistors that are aligned in the thermal head. Two-dimensional recording is effected by sequentially performing recording of respective lines while feeding a recording sheet at a constant speed in the auxiliary scanning direction.

However, for the following reason, it is difficult for the above halftone recording method to realize recording of high image quality. Since the recording density of each gradation level is mainly determined by the temperature of the heating resistors of the thermal head, a temperature variation due to a variation among the heating resistors, a variation of the environment temperature, heat storage, and other factors greatly affect the recording density. To solve this problem, many correcting measures have been proposed.

To correct for a variation of the environment temperature, there is known a correcting method in which a temperature variation is detected by, for instance, a thermistor attached to the thermal head and the width or number of pulses that is given for each gradation level is controlled. Thus, a variation of the recording density for the same gradation level is suppressed.

To correct for density unevenness due to a variation in resistance among the heating resistors, for instance, a paper entitled "Development of High-quality Video Copying" (Proceedings of the '86 General National Conference of the Institute of Electronics, Information and Communication Engineers of Japan, No. 1,276) states that the following measure is effective.

FIG. 36 is a block diagram showing an example of such a resistance correcting measure. In FIG. 36, a counter 101 counts clock pulses. An EPROM 102 receives a count value of the counter 101 as an address and outputs corresponding data (a correction coefficient number for a heating resistor). An EPROM 103 receives, as addresses, the output data of the EPROM 102 and 6-bit signals of cyan (C), magenta (M) and yellow (Y), and outputs corresponding data (for instance, resistance-corrected 6-bit C, M and Y signals).

A description will be made of the operation of the above circuit. Resistance values of the respective heating resistors are measured in advance, and the heating elements are grouped according to the measured resistance values. The EPROM 102 stores correction coefficients for the respective groups. Based on a signal sent from the counter 101 and indicating a heating resistor, the number table of the EPROM 102 is retrieved and a correction coefficient set number for the heating resistor is selected. Based on the selected correction coefficient set number, the EPROM 103 changes the magnitudes of the C, M and Y signals. That is, in response to an input signal having a gradation level somewhere between the 0th and 63rd levels, the EPROM 103 generates a signal having a gradation level also somewhere between the 0th and 63rd levels in accordance with the information on a variation of a heating resistor that is supplied from the EPROM 102. For example, when the ideal gradation level corresponding to the 1,000th heating resistor is the 38th level, the signal is corrected to the 40th or 35th level.

However, to realize recording of high image quality, this correction method requires a correction table that contains an enormous amount of data, resulting in a very expensive, large-sized apparatus. For example, where the number of bits of both of the gradation data signals and the correction coefficients of the EPROM 102 is increased to 8 to realize recording of high image quality, the EPROM 103 should have a capacity of 512 Kbits.

On the other hand, recently, a printer is marketed which can perform both a sublimation type operation capable of providing high image quality and the melting type operation capable of providing high-speed recording. In this type of printer, a melting type ink sheet or a sublimation type ink sheet is mounted on a conventional halftone recording apparatus.

However, to realize halftone recording either by using both of the melting type and sublimation type operations or by using one of those, problems should be solved which relate to the size of the heating resistors of the thermal head and the head driving method.

In the sublimation type recording, since the density is modulated within one pixel, the temperature distribution of the heating elements of the thermal head is desired to be uniform in each pixel. Each heating resistor has a long and narrow shape. Ideally, the width in the main scanning direction and the length in the auxiliary scanning direction of the heating resistor should be approximately the same. However, in this case, horizontal streaks likely occur in low-gradation recording, thus deteriorating image quality. This phenomenon in low-gradation recording occurs such that each heating resistor has a temperature distribution that is longer in the horizontal direction and a gap is thereby formed between the corresponding pixel of the next line. For example, with resolution of 300 DPI, the width in the main scanning direction is about 83 μm and the length in the auxiliary scanning direction is about 200 μm. As described above, to suppress the occurrence of horizontal streaks, each heating resistor of the thermal head are made long and narrow while its aspect ratio is increased as a tradeoff. (The aspect ratio is a ratio between widths of recorded horizontal and vertical lines. In the above example, a horizontal width of about 83 μm and a vertical width of about 200 μm produces an aspect ratio of 2.4.)

On the other hand, since the melting type recording employs an area modulation method in which the transfer area is modulated within one pixel, the temperature distribution of the heating resistors is desired to assume concentric circles. To provide better sharpness and stability of recorded pixels, it is preferred that there exist a certain temperature difference. From this point of view, the shape of each heating resistor of the thermal head should be close to a square. However, in the melting type recording, each pixel is influenced by adjacent pixels more likely than in the sublimation type recording. Even if heat control is so performed as to refer to adjacent pixels, it is difficult to provide stable gradational expressions.

With the above described features, where the heating resistors that are usually used for the sublimation type recording are used for the melting type recording, a low-gradation portion may become too thin or have too low a density and overtransfer may occur in a high-gradation portion. Further, the density increases too steeply with the energy applied. Thus, it is difficult to perform proper gradational recording. Even where the heating resistors are used for the original sublimation type recording, an excessively large aspect ratio will prevent sufficient quality for characters and a line image. Where the heating resistors having a shape suitable for the melting type recording are used for the sublimation type recording, horizontal streaks will deteriorate the image quality.

The problems of the above-described conventional halftone recording method and apparatus are summarized below.

First, as described below, in the conventional halftone recording method and apparatus, particularly in the sublimation type recording, horizontal streaks may occur and sufficient quality will not be obtained for characters and a line image.

Second, driving with the thermal head using either the long and narrow heating resistors or the square heating resistors cannot accommodate both of the melting type and sublimation type recording methods at the same time, that is, causes insufficient image quality in one of the two methods.

Third, burning in high-gradation recording deteriorates image quality. A plurality of energizing pulses are applied to realize n gradation levels. In high-speed recording, the surface of a recording sheet may be scorched when the temperature of the thermal head becomes too high.

Fourth, in the conventional halftone recording apparatus, a less expensive recording head for binary use is employed, and n-gradation recording is realized by n−1 times of data transfer and n−1 times of energization. This driving method has a problem that where n is increased to, for instance, 256 or 512 to attain recording of high image quality, the transfer time becomes very long to disable high-speed recording. Further, to realize recording of high image quality, each correction means should be very precise. This will increase the volume of tables, making the apparatus large and expensive.

SUMMARY OF THE INVENTION

The present invention has been made to solve the above problems, and objects of the invention are to produce high-quality images with less recognizable horizontal streaks and a proper aspect ratio, to provide recording of high image quality even with a halftone recording apparatus using both of melting type recording and sublimation type recording, to realize recording of high image quality free of burning, and to realize, at a low cost, halftone recording capable of producing high-quality images at high speed.

According to a first aspect of the invention, there is provided a halftone recording method for performing recording onto a recording sheet with a plurality of gradation levels while moving the recording sheet, wherein a plurality of sheet feeding operations are performed for one line, and recording operations are performed in a dispersive manner based on gradation data that are different for the respective sheet feeding operations.

According to a second aspect of the invention, there is provided a halftone recording apparatus comprising:
    sheet feeding means for moving a recording sheet;
    a recording head for performing recording onto the recording sheet with a plurality of gradation levels; and
    gradation control means for controlling the sheet feeding means so that the sheet feeding means performs a plurality of sheet feeding operations for one line, and for controlling the recording head so that the recording head performs recording operations in a dispersive manner based on gradation data that are different for the respective sheet feeding operations.

In the halftone recording apparatus according to the second aspect of the invention, the gradation control means may comprise:
    gradation reference value generating means for generating gradation reference values that are different for the respective sheet feeding operations;
    comparison means for comparing, for each of the sheet feeding operations, the gradation reference values with gradation data as input or corrected after being input, and supplying the recording head with comparison results as the gradation data that are different for the respective sheet feeding operations; and
    energizing pulse generating means for supplying energizing pulses to the recording head to cause the recording head to perform the recording operations based on the gradation data that are different for the respective sheet feeding operations.

In the halftone recording apparatus according to the second aspect of the invention, the gradation control means may change a corresponding relationship between the sheet feeding operations and the recording operations every line or every predetermined lines.

According to a third aspect of the invention, there is provided a halftone recording apparatus comprising:
    sheet feeding means for moving a recording sheet;
    a recording head having a plurality of heating resistors for performing recording onto the recording sheet with a plurality of gradation levels;

gradation control means for controlling the sheet feeding means so that the sheet feeding means performs a plurality of sheet feeding operations for one line, and for controlling the recording head so that the recording head performs recording operations in a dispersive manner based on gradation data that are different for the respective sheet feeding operations;

recording control means for controlling the thermal head so that a different part of the heating resistors are caused to heat for each of the sheet feeding operations so that an interval between adjacent recorded portions are wider than an interval of adjacent ones of the heating resistors; and switching means for selectively supplying outputs of the gradation control means and outputs of the recording control means to the recording head.

In the halftone recording apparatus according to the third aspect of the invention, a length of each of the heating resistors in an auxiliary scanning direction may be 0.6 to 1.7 times a width of each of the heating resistors in a main scanning direction.

In the halftone recording apparatus according to the third aspect of the invention, straight lines connecting recorded portions may form an angle of 10° to 35°.

According to a fourth aspect of the invention, there is provided a halftone recording apparatus comprising:

a recording head for performing recording onto a recording sheet with a plurality of gradation levels;

cooling reference storing means for storing a cooling timing in advance; and a cooling timer for suspending the recording of the recording head for a predetermined period at the stored cooling timing.

According to a fifth aspect of the invention, there is provided a halftone recording apparatus comprising:

a recording head for performing recording onto a recording sheet with n gradation levels, where n is an integer not smaller than 2;

gradation conversion means for converting external input gradation data to an energizing pulse level k that is larger than n−1, where k is an integer not smaller than 3;

gradation reference value generating means for generating a gradation reference value;

comparison means for comparing the gradation reference value with the energizing pulse level to generate comparison data, and supplying the comparison data to the recording head; and constant energizing pulse generating means for supplying energizing pulses having a constant width p to the recording head to cause the recording head to perform the recording based on the comparison data.

The halftone recording apparatus according to the fifth aspect of the invention may further comprise:

auxiliary energizing pulse generating means for supplying an auxiliary energizing pulse having a width q that is smaller than p; and auxiliary energizing pulse comparing means for enabling or disabling the auxiliary energizing pulse based on the energizing pulse level.

In the halftone recording apparatus according to the fifth aspect of the invention, the auxiliary energizing pulse generating means may output the auxiliary energizing pulse before the energizing pulses having the constant width p.

In the halftone recording apparatus according to the fifth aspect of the invention, the ratio between the width p and the width q may be approximately equal to $2^m:1$, where m is an integer of 1 or larger.

BRIEF DESCRIPTION OF THE DRAWINGS

FIG. 7 is a general timing chart of energizing pulses supplied to a thermal head;

FIG. 8 is a timing chart of energizing pulses supplied to a thermal head in the halftone recording apparatus according to the first embodiment of the invention;

DESCRIPTION OF THE PREFERRED EMBODIMENTS

Embodiment 1

A halftone recording method and apparatus according to a first embodiment will be described with reference to the drawings. In the halftone recording method and apparatus of the first embodiment, recording of 1 line of input gradation data is performed with two times of sheet feeding, and recording for odd-numbered gradation levels is performed with the first sheet feeding and recording for even-numbered gradation levels is performed with the second sheet feeding.

Figure 1:
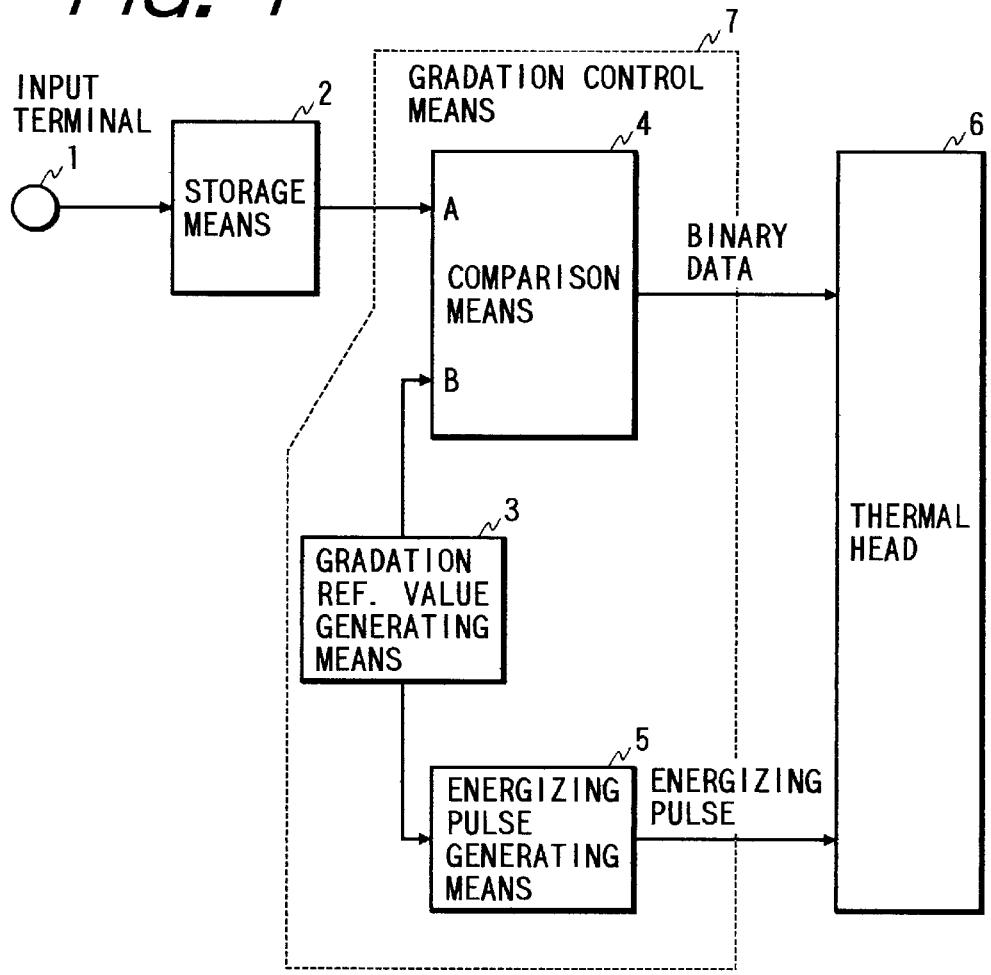
FIG. 1 is a functional block diagram showing a halftone recording apparatus according to a first embodiment of the present invention.

FIG. 1 is a functional block diagram showing the main part of the halftone recording apparatus of the first embodiment. In FIG. 1, an input gradation data signal of 8 bits, for instance, is input to an input terminal 1. A storage means 2 stores input gradation data of 1,280 pixels, for instance. A gradation control means 7 receives gradation data of 1 line from the storage means 2, and generates and supplies to a thermal head 6 binary data representing a gradation level of each pixel and energizing pulses to effect halftone recording based on the binary data.

The gradation control means 7 comprises of the following means. A gradation reference value generating means 3 generates a gradation reference value for generation of the binary data. A comparison means 4 compares the gradation data that is output from the storage means 2 with the gradation reference value that is output from the gradation reference value generating means 3, and outputs "1" if the former is greater than the latter and outputs "0" if the former is smaller than the latter. An energizing pulse generating means 5 receives the gradation reference value from the gradation reference value generating means 3, and generates energizing pulses. The reference value generating means 3 outputs odd gradation reference values in the first recording operation, and even gradation reference values in the second recording operation.

The thermal head 6 has heating resistors of a number equal to the number of pixels of 1 line, which is, for instance, 1,280. Receiving the binary data from the comparison means 4 and the energizing pulses from the energizing pulse generating means 5, the thermal head 6 selectively causes desired heating resistors to heat, to thereby transfer ink to a recording sheet. Each heating resistor of the thermal head 6 has a size of 80 $\mu$m in the main scanning direction and 110 $\mu$m in the auxiliary scanning direction, for instance.

Figure 2:
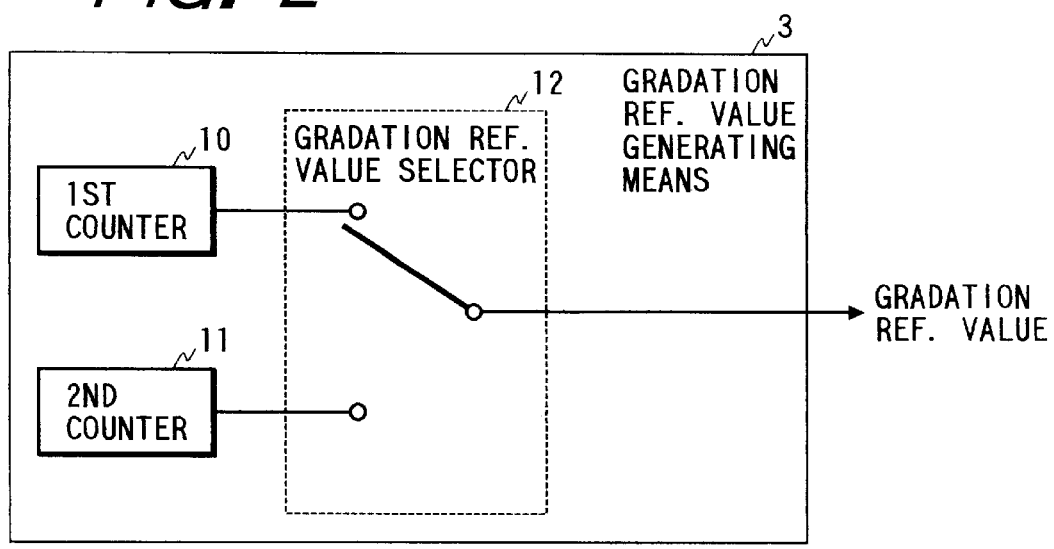
FIG. 2 is a functional block diagram showing a gradation reference value generating means of the first embodiment of the invention.

FIG. 2 is a block diagram showing the gradation reference value generating means 3 that constitutes the gradation control means 7. In FIG. 2, a first counter 10 outputs odd gradation reference values, and a second counter 11 outputs even gradation reference values. A gradation reference value selector 12 selects, as the gradation reference value, the output of the first counter 10 in the first recording operation and the output of the second counter 11 in the second recording operation.

Next, a description will be made of the operation of the halftone recording method and apparatus according to the first embodiment. First, referring to FIGS. 5–12, the general principle of operation of the halftone recording method and apparatus will be described.

For example, where the number n of gradation levels is 256, input gradation data takes one of 256 values (8 bits). However, a usually available thermal head can accept only binary data of "1" (recording) and "0" (non-recording), that is, cannot directly accept gradation data. Therefore, to realize halftone recording, it is necessary to convert each binary data representing a gradation level to a pulse train, and transfer the pulse train to the thermal head with energizing pulses applied in synchronism with the respective pulses of the pulse train.

Figures 3, 5:
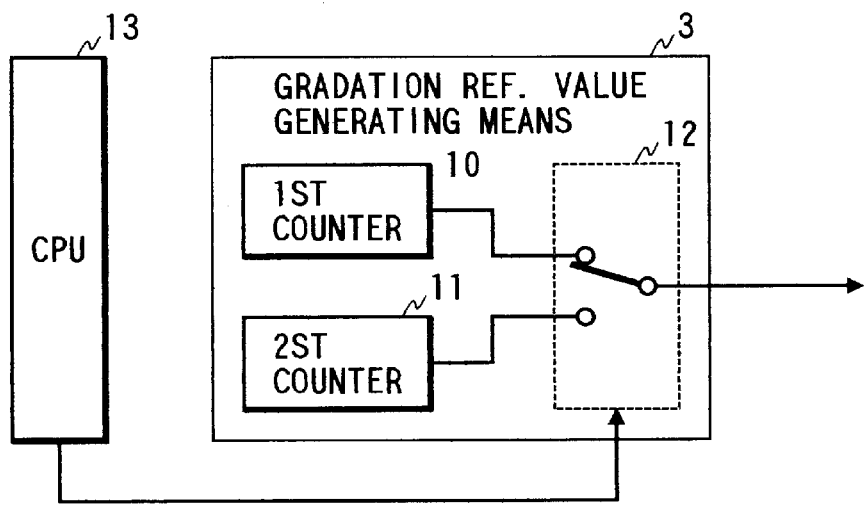
FIG. 3 is a functional block diagram showing another gradation reference value generating means of the first embodiment of the invention.
FIG. 5 shows a conversion table for converting gradation data to binary data in the first embodiment of the invention.

In the case of 256-gradation recording, 255 times of data transfer and 255 times of energization are required. FIG. 5 shows a conversion table for converting the gradation data to the binary data in such a case. As shown in FIG. 5, the conversion from the 256-value data to the binary data is performed in the following manner.

The comparison means 4 compares the gradation data (256-value data) that is input to terminal A of the comparison means 4 from the storage means 2 with the gradation reference value that is input to terminal B from the gradation reference value generating means 3. The comparison means 4 continues to output binary data "1" while the gradation reference value is smaller than the gradation data (256-value data). And the comparison means 4 continues to output binary value "0" while the gradation reference value is larger than the gradation data (256-value data) until the gradation reference value reaches the last one, i.e., the 255th reference value. That is, where the number of gradation levels of the input gradation data is n, the comparison means 4 outputs n 1's and (255−n) 0's. The binary data and a plurality of heating resistors of the thermal head 6 are in one-to-one correspondence. Therefore, each binary data corresponds to gradation data of each pixel of one line, and the number of binary data is equal to the number of heating resistors, which is, for instance, 1,280. The data "1" means that an energizing pulse corresponding to the position of the data "1" should be supplied to one heating resistor, and the data "0" means that no energizing pulse should be supplied.

Based on the binary data that are produced according to the table of FIG. 5, energization of 255 times in total is performed on each of a plurality of heating resistors of the thermal head 6. This energizing method will be described with reference to FIG. 6.

Figure 6:
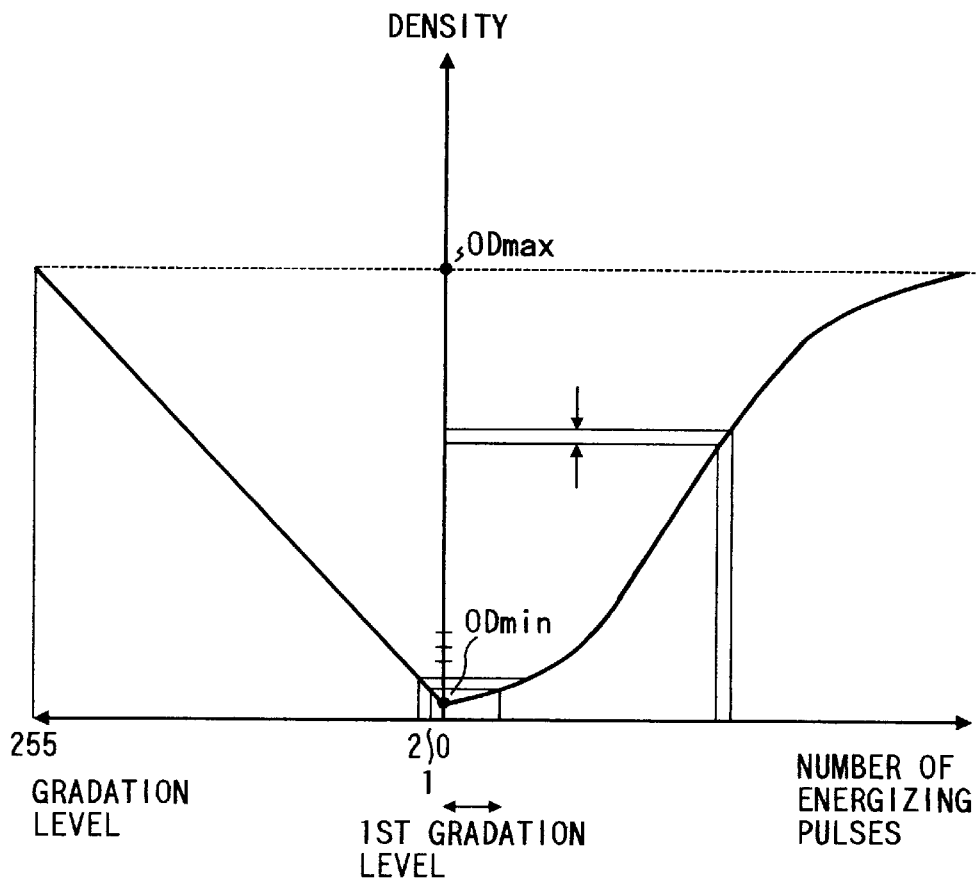
FIG. 6 is a graph showing a fundamental density characteristic of a halftone recording apparatus.

As shown in FIG. 6, the fundamental density characteristic of each of the melting type and sublimation type recording has an S-shaped curve. That is, in a range where the number of energizing pulses is small, the density increases gradually with respect to the number of energizing pulses. In an intermediate range, the density increases linearly with respect to the number of energizing pulses. In a range where the number of energizing pulses is large, the increase of the density with respect to the number of energizing pulses is saturated.

As described above, an increase ΔOD with respect to a fixed increase of the number of energizing pulses is not constant but varies with the number of energizing pulses.

Figures 11, 12:
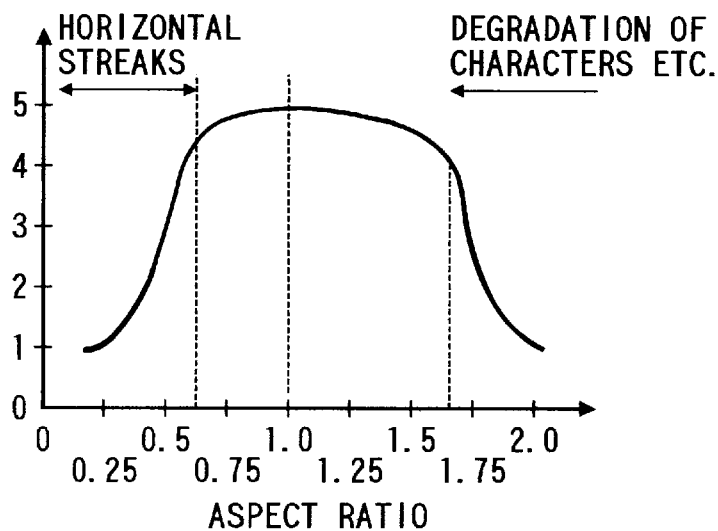
FIG. 11 is a graph showing a relationship between the image quality and the aspect ratio of heating resistors in the halftone recording apparatus according to the first embodiment of the invention.
FIG. 12 shows a relationship between gradation reference values and energizing pulse widths.

Therefore, if the increase of the number of energizing pulses with respect to the increase of the gradation is made constant, sufficient reproduction performance is not obtained in a highlight portion and a shadow portion. To solve this problem, setting is made in advance in the energizing pulse generating means 5 such that the pulse width, for instance, is not fixed but varied in accordance with the order of pulses so as to provide a linear density OD vs. gradation characteristic. FIG. 12 shows a specific example of such setting. In FIG. 12, gradation reference values (in the order of the energizing pulses) 1, 2, 3, 4, 5, 6, 7, . . . , 254 and 255 correspond to energizing pulse widths 20, 10, 8, 7, 6, 5, 5, . . . , 6 and 5, respectively.

Actually, in a conventional halftone recording method and apparatus, as is apparent from a timing chart of FIG. 7 showing signals applied to the thermal head 6, after the comparison means 4 supplies the first-bit data (leftmost data of FIG. 5) of the binary data corresponding to the first gradation level to each of a plurality of heating resistors, the energizing pulse generating means 5 supplies the first one (having a pulse width of 20 as indicated in the topmost row of FIG. 12) of the energizing pulses corresponding to the first gradation level to all the heating resistors to allow those to heat. At the same time, the comparison means 4 transfers binary data corresponding to the second gradation level. Subsequently, binary data corresponding to the second, third, . . . , and 255th gradation levels are transferred, and associated energizing pulses are supplied to the thermal head 6. For the above-described reason, the energizing pulses have different widths.

The last, 255th energizing pulse (see FIG. 7) provide the maximum density. The reason why the binary data (top part of FIG. 7) and the corresponding energizing pulse (bottom part) are deviated in time from each other is that the thermal head 6 temporarily latches the binary data to realize high-speed processing.

Figure 9:
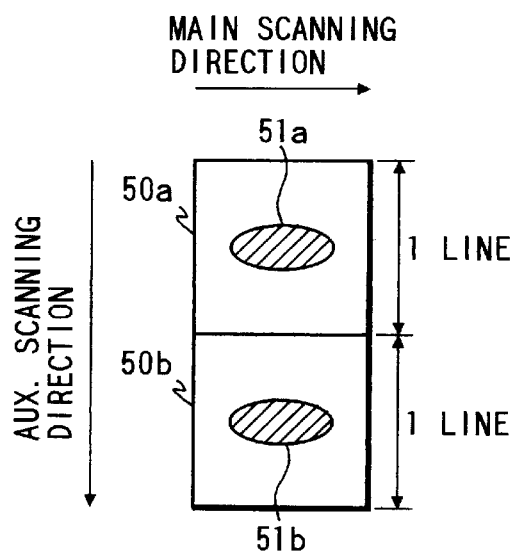
FIG. 9 illustrates a general state of recording pixels in the halftone recording apparatus.

If the input gradation data is "4," "1" is transferred 4 times and "0" is transferred 251 times, and the corresponding energizing pulses are supplied to the thermal head 6. Therefore, depending on the shape, i.e., the aspect ratio of the heating resistors of the thermal head (for example, when it is approximately square), recording is effected only at a central portion of one pixel, to possibly cause a horizontal streak with the next line. FIG. 9. illustrates a state of recording pixels in such a case. Recorded portions 51a and 51b are located at the centers of respective pixels 50a and 50b that belong to adjacent lines, and a gap formed between the recorded portions 51a and 51b causes a horizontal streak.

Figure 10:
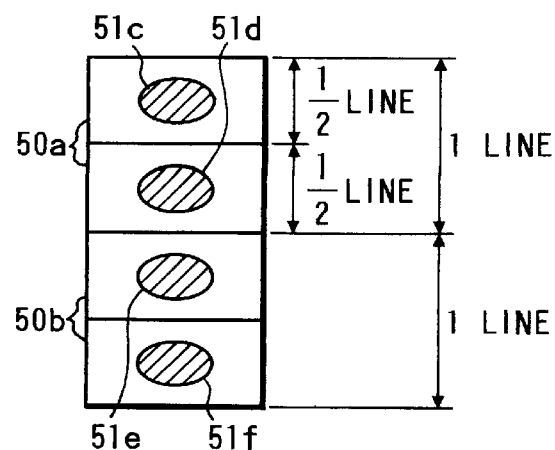
FIG. 10 illustrates a state of recording pixels in the halftone recording apparatus according to the first embodiment of the invention.

To solve this problem, the halftone recording method and apparatus of the first embodiment are adapted to provide recording pixels as shown in FIG. 10. More specifically, 1-line data is divided into, for instance, two parts, and recording of odd-numbered gradation levels (1 and 3 in the example of FIG. 7) is performed in the first operation and recording of even-numbered gradation levels (2 and 4 in the example of FIG. 7) is performed in the second operation. That is, the recording is performed in a discrete manner using different binary data. By recording a gradational image discretely, horizontal streaks are made unrecognizable to human eyes by virtue of their integration ability, and image quality is thereby improved. (The term "discretely" means that an original one recording portion is divided into at least two recording portions whose centers are spaced from each other and the two recording operations are performed using different energizing pulses.)

Figure 4:
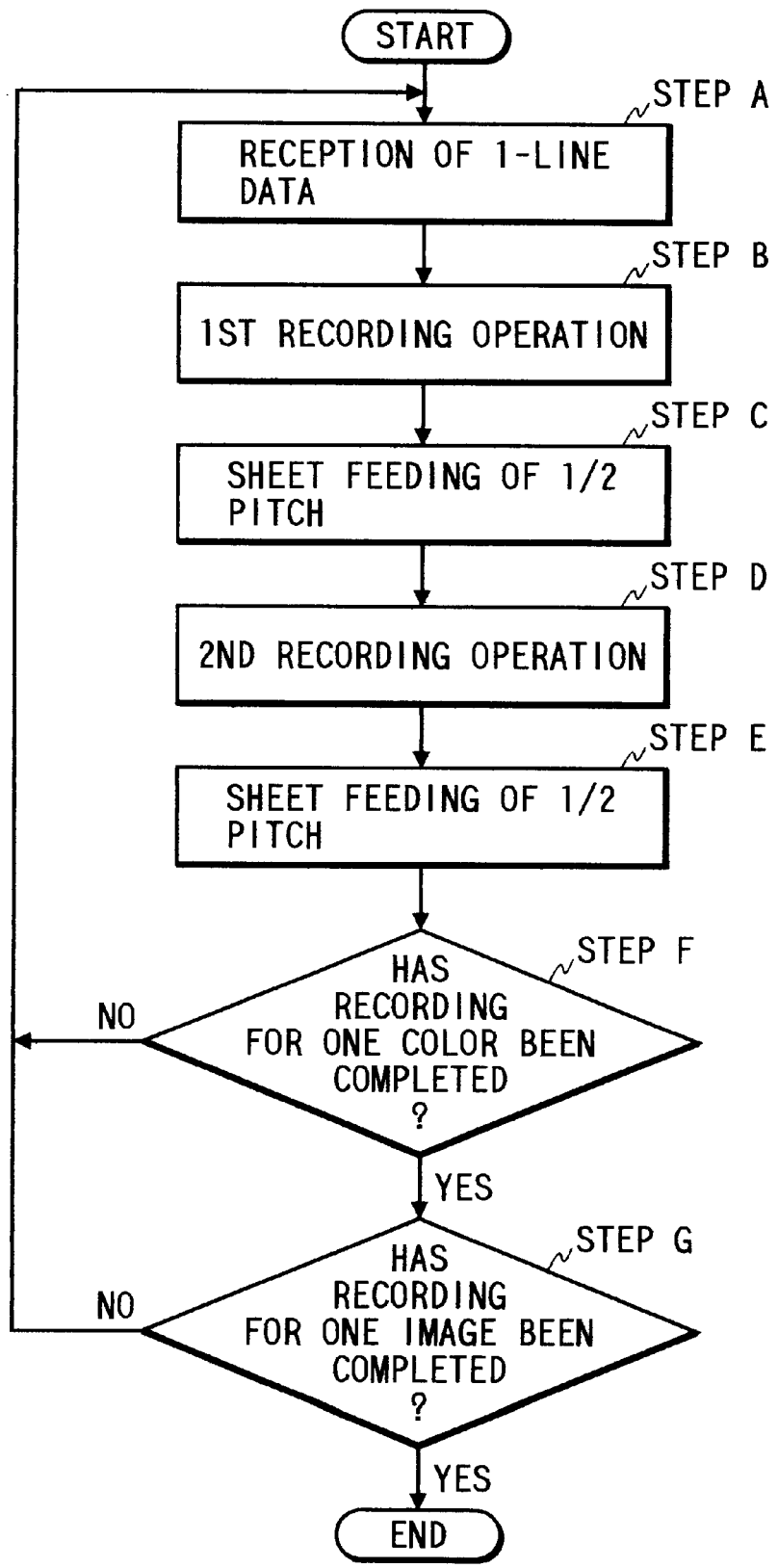
FIG. 4 is a flowchart showing a recording sequence of a halftone recording method according to the first embodiment of the invention.

Referring to a flowchart of FIG. 4, the operation of the first embodiment will be described in detail. FIG. 4 shows an example of a recording sequence of the halftone recording, which consists of steps A–G.

Step A

In step A, the comparison means 4 of the gradation control means 7 receives 1-line gradation data (0–255) of 1,280 pixels, for instance.

Digital gradation data that has been produced by A/D-converting an image signal of a host computer (not shown) or a TV image signal is sequentially input to the input terminal 1, and sequentially stored, 1-line data at a time, into the storage means 2 in accordance with an output of an address generating means (not shown). Gradation data corresponding to the first to 1,280th heating resistors of the thermal head 6 are sequentially read from the storage means 2.

Upon completion of the data reception, the process goes to step B.

Step B

In step B, the first recording operation is performed. Specifically, the gradation reference value generating means 3 generates gradation reference values 1, 3, 5, . . . , 255, and the comparison means 4 produces binary data by comparing those gradation reference values with the gradation data.

In contrast to the above, conventionally, the gradation reference value generating means 3 sequentially generates gradation reference values 1, 2, 3, . . . , 255, and the comparison means 4 simply compares those values with the gradation data.

In the first recording operation, the gradation reference value selector 12 of the gradation reference value generating means 3 selects the output of the first counter 10, and outputs it as the gradation reference value. The first counter 10 generates gradation reference values 1, 3, 5, . . . , 255. The comparison means 4 generates binary data according to the corresponding relationship between the 256-value data and the gradation reference value shown in FIG. 5.

On the other hand, the output of the gradation reference value generating means 3 is also supplied to the energizing pulse generating means 5. The energizing pulse generating means 5 produces an energizing pulse corresponding to the gradation reference value. The relationship between the gradation reference value and the energizing pulse is preset as shown in FIG. 12.

A description will be made with reference to a timing chart of FIG. 8. A timing chart for the first recording operation is shown in the left-hand half of FIG. 8.

When the gradation reference value is "1," the energizing pulse generating means 5 selects "20" and retains it therein. On the other hand, the comparison means 4 converts 1-line gradation data to binary data, and sequentially supplies the binary data to the thermal head 6. At the same time when the first binary data is supplied to the thermal head 6, the energizing pulse generating means 5 supplies the thermal head 6 with the value "20" that was retained when the gradation reference value was "1." Recording by the first energizing pulse is then effected in accordance with the first bit of the binary data.

Then, 1-line gradation data is again read from the storage means 2 by the address generating means (not shown). The gradation reference value generating means 3 generates a gradation reference value "3," and the comparison means 4 converts the gradation data to binary data by comparing it with the reference value "3" and supplies the binary data to the thermal head 6. On the other hand, upon reception of the gradation reference value "3," the energizing pulse generating means 5 supplies a retained value "8" to the thermal head 6. Recording by the second energizing pulse is then effected in accordance with the second bit of the binary data.

With the gradation reference values generated in the above manner, the data corresponding to the odd-numbered gradation levels (1st, 3rd, 5th, 7th, . . . , and 255th gradation levels as mentioned above) are transferred and the energizing pulses corresponding to the same gradation levels are supplied in the first ½-line portion (left-hand side) of FIG. 8. As a result, the top portion 51c (51e) in FIG. 10 is recorded.

Step C

In step C, sheet feeding of a ½ pitch (half of the conventional amount) is performed by a sheet feeding mechanism (not shown). For example, where the resolution is 300 DPI, a sheet is fed by about 83 μm per line conventionally. In this embodiment, a sheet is fed by half of that value. As a result, the ½-line sheet feeding allows the bottom portion 51d (or 51f) to be recorded (see FIG. 10).

Step D

In step D, the second recording operation is performed. Specifically, the gradation reference value generating means 3 generates gradation reference values 2, 4, 6, . . . , 254, and the comparison means 4 produces binary data by comparing those gradation reference values with the gradation data.

In the second recording operation, the gradation reference value selector 12 of the gradation reference value generating means 3 selects the output of the second counter 11, and outputs it as the gradation reference value. The second counter 11 generates gradation reference values 2, 4, 6, . . . , 254. The comparison means 4 generates binary data according to the corresponding relationship between the 256-value data and the gradation reference value shown in FIG. 5.

The right-hand ½-line portion of FIG. 8 is a timing chart showing the binary data and the energizing pulses that are supplied to the thermal head in this operation. With the gradation reference values generated in the above manner, the data corresponding to the even-numbered gradation levels (2nd, 2nd, 4th, 6th, 8th, . . . , and 254th gradation levels as mentioned above) are transferred and the energizing pulses corresponding to the same gradation levels are supplied in the second ½-line portion (right-hand side) of FIG. 8. As a result, the bottom portion 51d (51f) in FIG. 10 is recorded.

Upon completion of the execution of step D, the process goes to step E.

Step E

In step E, sheet feeding of a ½ pitch is performed in the same manner as in step C. Recording of one line is completed by executing steps A–E, and the process goes to step F.

Step F

In step F, a control device (not shown) checks whether recording of a prescribed number of lines has been completed. If it has been completed, the process goes to step G. If it has not been completed, the process returns to step A, to repeatedly execute steps A–E.

Upon completion of the execution of step F, the process goes to step G.

Step G

In step G, it is checked whether the processing for three colors of Y, M and C or four colors of Y, M, C and Bk has been completed. If it has been completed, the recording of one image is finished. If it has not been completed, the process returns to step A, to repeatedly execute steps A–F.

To effect the ½-pitch sheet feeding in this embodiment, a motor or the like (not shown) may be driven by one or a plurality of pulses. Alternatively, there may be provided a mechanism that effects sheet feeding during the recording.

The ideal shape of the heating resistors of the thermal head 6 is a square. However, it has been concluded that even if the heating resistors are not shaped like a square, the image quality is not much degraded as long as the ratio between the length in the auxiliary scanning direction and the width in the main scanning direction (aspect ratio) falls within the range of 0.7–1.7. FIG. 11 shows a relationship between the 5-level evaluation result and the ratio between the length in the auxiliary scanning direction and the width in the main scanning direction (aspect ratio). While the horizontal axis represents the aspect ratio, numerals associated with the vertical axis represent subjective evaluation results of image quality in which 5, 4, 3, 2 and 1 mean very good, good, average, poor, and very poor, respectively.

FIG. 11 indicates that the image quality is degraded if the aspect ratio is smaller than 0.7 (horizontal streaks become recognizable), or if it is larger than 1.7 (horizontal lines become thick).

The reason why in the first embodiment the first and second recording operations are performed using different data (for odd-numbered and even-numbered gradation levels) is that better gradation performance is obtained than in the case of using the same data for the two recording operations, and that the recording speed can be made faster than in the case of effecting two times of recording using 255 data.

The gradation reference values may be output such that 1, 3, 5, . . . , 255 are output in the first operation and 1, 2, 4, 6, 8, . . . , 254 are output in the second operation, with attention paid to the fact that the pulse for the first gradation level is used to increase the substrate temperature of the thermal head 6. Where a cooling time is provided between the first and second recording operations, the energizing pulses are applied in approximately the same state in the first and second recording operations, enabling provision of more stable image quality.

Although the gradation reference value generating means 3 of FIG. 2 is composed of the two counters 10 and 11 and the selector 12, the two counters may be combined into a single counter with the selector eliminated. As a further alternative, the gradation reference value generating means 3 may be constructed by a table.

Although in the above embodiment the pulse-width control is performed on the energizing pulses, the same effects can be obtained by pulse-number control.

Which of the first and second recording operations should be performed for odd or even-numbered gradation levels may be switched every line or every predetermined lines rather than is fixed. This has an effect of further dispersing horizontal streaks, and therefore contributes to provision of recording of high image quality. This is realized by controlling the gradation reference value selector 12 by a CPU 13 as shown in FIG. 3. A counter for counting the number of recording lines may additionally be provided, in which case the switching is performed based on the output of the counter.

In addition, the method of generating the gradation reference values themselves may be modified by replacing the first and second counters 10 and 11 with tables and downloading the gradation reference values from the CPU 13 or the like. In this case, a procedure may be employed in which recording for the 1st, 3rd, 5th, 7th, . . . gradation levels is performed in the first recording operation and recording for the 2nd, 4th, 6th, 8th, . . . gradation levels is performed in the second recording operation, and then recording for the 1st, 2nd, 5th and 6th, . . . gradation levels is performed in the next first recording operation and recording for the 3rd, 4th, 7th and 8th, . . . gradation levels is performed in the next second recording operation. The relationship between the first and second recording operations and the gradation levels may be changed every predetermined lines.

The order of the recording for odd-numbered gradation levels and the recording for even-numbered gradation levels may be reversed. Further, a procedure may be employed in which recording for the 1st, 2nd, 5th, 6th, 9th, 10th, . . . gradation levels is performed in the first recording operation, and recording for the 3rd, 4th, 7th, 8th, 11th, 12th, . . . gradation levels is performed in the second recording operation. Another procedure may be employed in which recording for the 4th, 5th, 6th, 10th, 11th, 12th, . . . gradation levels is performed in the first recording operation, and recording for the 1st, 2nd, 3rd, 7th, 8th, 9th, . . . gradation levels is performed in the second recording operation. In short, the same effects can be obtained by any dispersive recording in which recording for all the 1st to 255th gradation levels is performed in the first and second recording operations combined.

Although the first embodiment is directed to the case where the number of gradation levels is 256, the invention can also be applied to the case where it is 64 (6 bits), 512 (9 bits), etc. The sheet feeding length per one recording operation is not limited to a ½ pitch, but the same effects can be obtained if sheet feeding lengths of the two recording operations sum to 1 pitch as in the case of a ¼ pitch and a ¾ pitch.

Although in the first embodiment the recording of 1-line input gradation data is divided into two recording operation in the sheet feeding direction, it may be divided into three, four, or some other number of recording operations. In the case of employing four recording operations, recording for the 1st, 5th, 9th, . . . gradation levels is performed in the first operation, recording for the 2nd, 6th, 10th, . . . gradation levels is performed in the second operation, recording for the 3rd, 7th, 11th, . . . gradation levels is performed in the third operation, and recording for the 4th, 8th, 12th, . . . gradation levels is performed in the fourth operation. A sheet is fed by a ¼ pitch per recording operation. This is more effective in realizing recording of high image quality that is free of horizontal streaks.

Although the first embodiment is intended to establish a linear relationship between the gradation and the density, the invention is not limited to such a case. For example, a linear relationship between the gradation and the lightness may be established.

As described above, by virtue of a plurality of recording operations per line, the first embodiment can prevent horizontal streaks and can thereby improve the image quality in recording a halftone image.

Embodiment 2

The second embodiment of the invention will be described below.

The second embodiment is directed to a halftone recording method and apparatus capable of using both of the sublimation type recording and the melting type recording. In the method and apparatus according to the second embodiment, a switching means is provided to perform the sublimation type recording by using the gradation control means described in the first embodiment and the melting type recording by an odd/even control means described below. The second embodiment can realize recording of high image quality among apparatuses capable of using the two types of recording.

Figure 14:
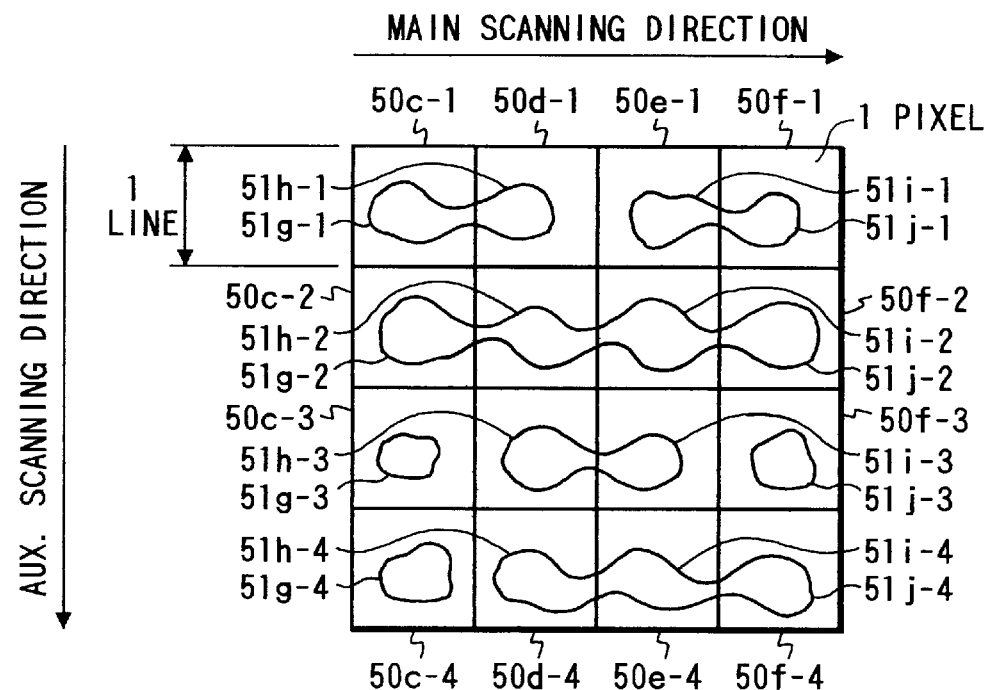
FIG. 14 illustrates a general state of recorded pixels that have been recorded by a halftone recording apparatus.
Figure 15:
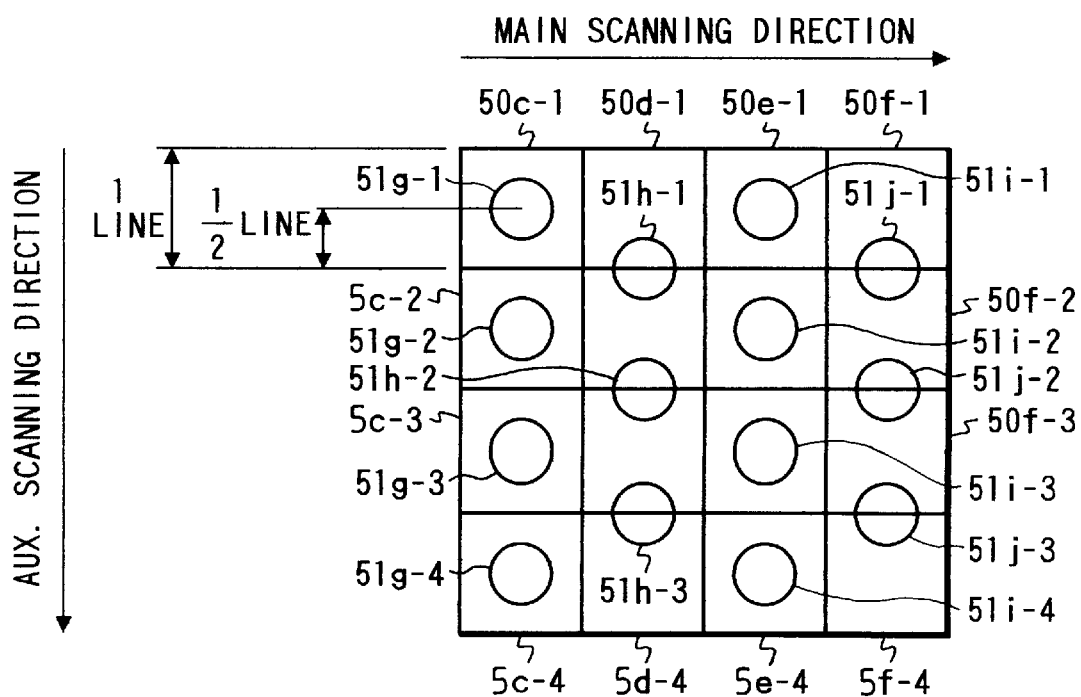
FIG. 15 illustrate a state of recorded pixels that have been recorded by the halftone recording apparatus of the second embodiment of the invention.

A description will be made of the principle of operation of the melting type recording with reference to FIG. 14 before the operation of the halftone recording apparatus of the second embodiment. FIG. 14 shows a state of recorded pixels that have been recorded by a conventional apparatus. (FIG. 15 shows a state of recorded pixels that have been recorded by the apparatus of the second embodiment.) In these figures, four pixels are arranged in each of the main scanning direction (horizontal direction in the figures) and in the auxiliary scanning direction (vertical direction in the figures). For convenience of description, the pixels are represented by symbols 50c–50f from the left and auxiliary symbols −1 to −4 from the top. Therefore, the top-left pixel is denoted by 50c-1 and the bottom-right pixel is denoted by 50f-4. Similarly, recorded portions corresponding to those pixels are represented by symbols 51g–51j from the left and auxiliary symbols −1 to −4 from the left. Therefore, the top left recorded portion is denoted by 51g-1 and the bottom-right recorded portion is denoted by 51j-4.

In FIG. 14, recorded portions of part of adjacent pixels are connected to each other in the main scanning direction. In the topmost line, the recorded portions 51g-1 and 51h-1 are connected to each other and the recorded portions 51i-1 and 51j-1 are also connected to each other. In the second line, the four recorded portions 51g-2 to 51j-2 are connected together. In the third line, the recorded portions 51h-3 and 51j-3 are connected to each other. In the fourth line, the three recorded portions 51h-4 to 51j-4 are connected together.

In this manner, in the recording of the conventional apparatus, a recorded portion of each pixel is likely connected to a recorded portion of an adjacent pixel due to an influence of heat from the adjacent heating resistor that heats simultaneously. The image quality becomes unstable as shown in FIG. 14.

In contrast, in the second embodiment, after 1-line input gradation data is received, 1-line data is recorded by two recording operations. More specifically, first only the odd-numbered heating resistors (corresponding to the pixels 5c and 5e) are allowed to heat while data for the even-numbered heating resistors (corresponding to the pixels 5d and 5f) are masked so that data "0" is always transferred to the thermal head. After a sheet is fed by a ½ pitch, to allow only the even-numbered heating resistors to heat this time, data for the odd-numbered heating resistors are masked so that data "0" is always transferred to the thermal head. Then, the sheet is again fed by a ½ pitch. As a result, the recorded state shown in FIG. 15 is obtained.

With the above operation, the interval between adjacent recorded portions is increased to suppress influences of heat from adjacent heating resistors. Since recorded portions are never connected to each other, the image quality can be improved. In this manner, in the method and apparatus according to the second embodiment, the melting type recording, in which influences of heat from adjacent heating resistors can be suppressed, is performed in an exclusive manner. Thus, stable image quality can be obtained.

Figure 13:
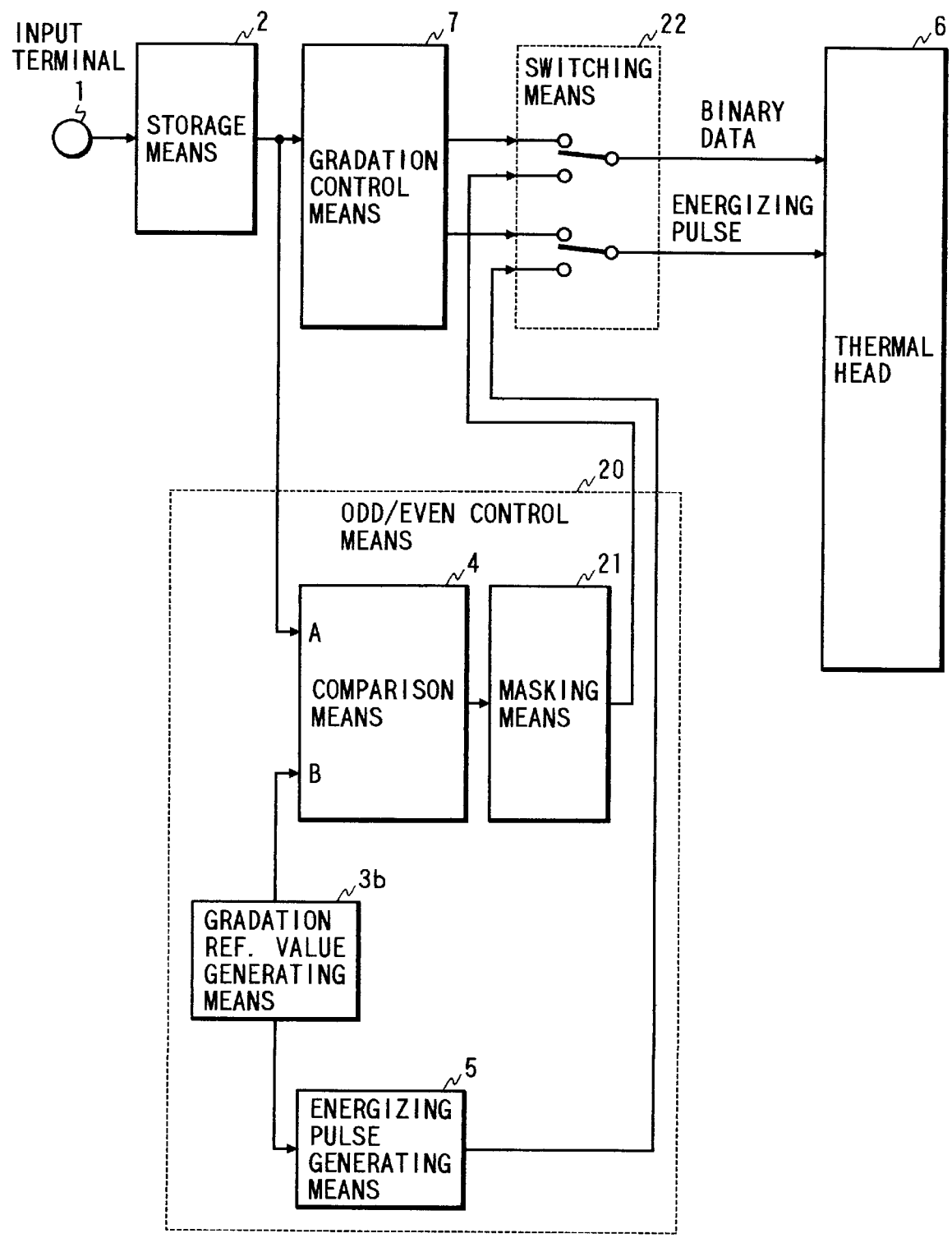
FIG. 13 is a functional block diagram showing a halftone recording apparatus according to a second embodiment of the invention.

The halftone recording apparatus of the second embodiment will now be described with reference to the drawings. A storage means 2, a thermal head 6, and a gradation control means 7 shown in FIG. 13 are the same as or correspond to those shown in FIG. 1. An odd/even control means 20, which causes the odd-numbered heating resistors and the even-numbered heating resistors to heat alternately, consists of a gradation reference value generating means 3, a comparison means 4, an energizing pulse generating means 5, and a masking means 21. The masking means 21 masks data for the even-numbered heating resistors to generate data "0" when the odd-numbered heating resistors are allowed to heat, and masks data for the odd-numbered heating resistors to generate data "0" when the even-numbered heating resistors are allowed to heat. A switching means 22 selects binary data and energizing pulses from the gradation control means 7 or those from the odd/even control means 20, and supplies the selected data and pulses to the thermal head 6.

Next, a description will be made of how the above apparatus operates. First, a control device recognizes based on an input through a control panel (not shown), a recording sheet, an ink sheet mark, an ink sheet cassette, or some other item whether to perform the sublimation type recording or melting type recording. Based on a recognition result, the control device switches the switching means 22 to the top or bottom side. For example, in the sublimation recording, the switching means 22 is switched to the top side, so that the binary data and the energizing pulses that are output from the gradation control means 7 are selected and supplied to the thermal head 6. On the other hand, in the melting type recording, the switching means 22 is switched to the bottom side, so that the binary data and the energizing pulses that are output from the odd/even control means 22 are selected and supplied to the thermal head 6.

Where the outputs of the gradation control means 7 are selected, the apparatus operates in the same manner as in the first embodiment.

Where the outputs of the odd/even control means 22 are selected, while the basic operation is the same as in the first embodiment the apparatus operates differently in terms of the gradation reference value generating means 3b and the masking means 21.

The gradation reference value generating means 3b, which is constituted of a counter or a table, counts up from 1 to 255 (1, 2, 3, . . . , 255) and outputs those values as gradation reference values in the first recording operation, i.e., when the odd-numbered heating resistors are to heat. The gradation reference values that are output from the gradation reference value generating means 3b are input to the comparison means 4 and the energizing pulse generating means 5. The energizing pulse generating means 5 sequentially outputs energizing pulses that correspond to the respective gradation reference values, and the comparison means 4 converts gradation data that are output from the storage means 2 to binary data by sequentially comparing the gradation data with the gradation reference value. The comparison means 4 and the energizing pulse generating means 5 operate in the same manner as in the first embodiment.

The masking means 21 performs masking on the binary data received from the comparison means 4. In the first recording operation, the masking means 21 masks data for the even-numbered heating resistors to generate data "0." For example, when the binary data are 1, 1, 0, 1, 1, 1, the masking means 21 converts those data to 1, 0, 0, 0, 1, 0. When the binary data are 1, 1, 1, 1, 1, 1, the masking means 21 converts those data to 1, 0, 1, 0, 1, 0. The binary data thus masked are input to the thermal head 6 via the switching means 22. The recorded portions 51g-1, 51j-1, etc. (see FIG. 15) are produced from those binary data. A recording sheet is then fed by a ½ pitch by a sheet feeding means (not shown).

The masking means 21 similarly operates in the second recording operation. In this case, the masking means 21 masks data for the odd-numbered heating resistors to generate data "0." For example, binary data are 1, 1, 0, 1, 1, 1 are converted to 0, 1, 0, 1, 0, 1. Binary data 1, 1, 1, 1, 1, 1 are converted to 0, 1, 0, 1, 0, 1. The binary data thus masked are input to the thermal head 6 via the switching means 22. The recorded portions 51h-1, 51j-1, etc. (see FIG. 15) are produced from those binary data. The recording sheet is fed by a ½ pitch by the sheet feeding means (not shown).

One-line recording that corresponds to 1-line input gradation data is completed by the above first and second recording operations. A two-dimensional image is obtained by performing those operations for one image.

Figure 16:
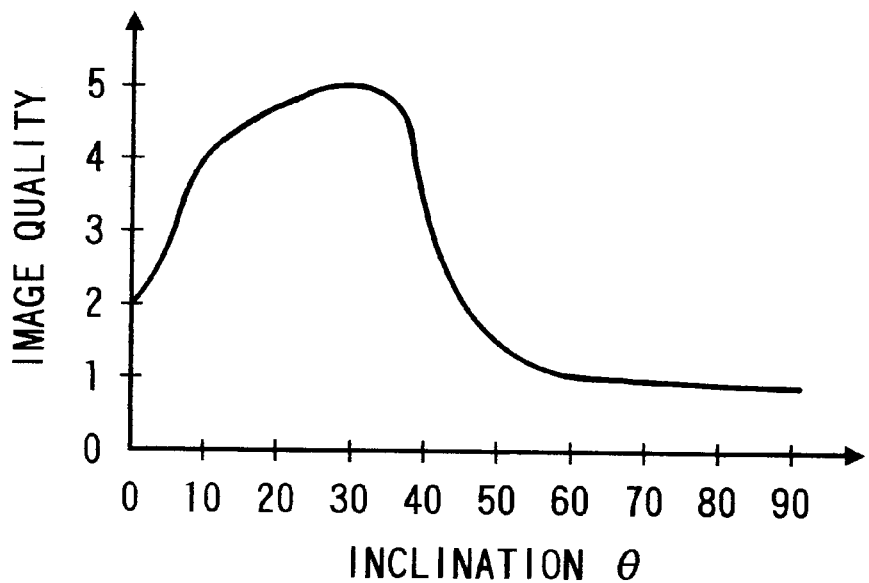
FIG. 16 is a graph showing a relationship between the image quality and the slope of a line connecting adjacent recording pixels in the halftone recording apparatus of the second embodiment of the invention.
Figure 17:
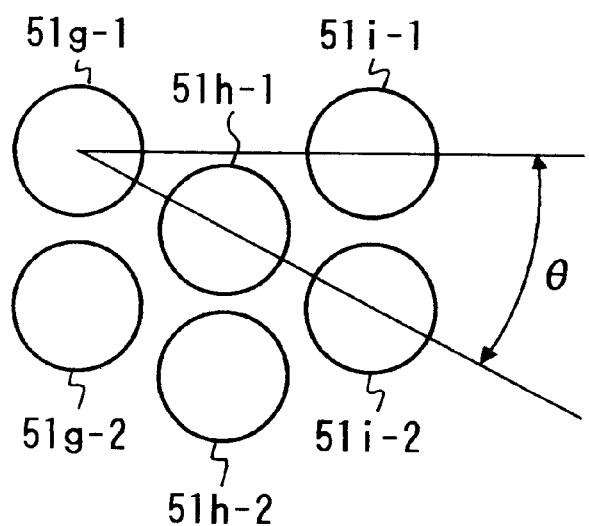
FIG. 17 illustrates the slope of a line connecting adjacent recording pixels in the halftone recording apparatus of the second embodiment of the invention.

It has been concluded that where recording for the odd-numbered pixels is performed in the first recording operation and recording for the even-numbered pixels is performed in the second recording operation, stable recording of high quality image can be realized by setting the slope of a line connecting odd-numbered pixels and even-numbered pixels at 10° to 35°. More specifically, an experiment was conducted using, as a parameter, a slope θ of a line connecting odd-numbered pixels and even-numbered pixels shown in FIG. 17, which illustrates details of a state of recorded portions. A result is shown in FIG. 16. It is understood from this experimental result that recorded portions horizontally adjacent to each other on the same line are likely connected to each other in a slope range of 0° to 10° and recorded portions horizontally adjacent to each other in the next line are likely connected to each other in a slope range of 35° to 45°. In either case, the image quality was degraded. Further, when the slope is larger than 45°, the image quality was greatly deteriorated because not only adjacent recorded portions were connected each other, but also a horizontal line drawn over the entire line becomes uneven.

In contrast, good images were recorded when the slope was in a range of 10° to 35°. This means that not only thermal interference from adjacent pixels should be avoided, but also a certain distance from adjacent pixels is needed.

The slope of a line connecting odd-numbered pixels and even-numbered pixels can be set at a prescribed value by changing the sheet feeding pitch. Since recorded positions depend on the recording speed, the viscosity of ink, the shape of the heating resistors, and other factors, the slope cannot be determined geometrically from the interval of the heating resistors and the sheet feeding pitch. Therefore, the slope between pixels should be determined experimentally.

The sheet feeding length need not always be set at a ½ pitch. A sheet may be fed by a ⅖ pitch in the first recording operation and by a ⅗ pitch in the second recording operation.

As described above, the second embodiment of the invention is provided with the odd/even control means 20 and the switching means 22. Where the melting type recording is performed, the adjacent heating resistors are caused to heat alternately based on the output of the odd/even control means 20. Since recorded portions of adjacent pixels are not connected to each other, the image quality becomes stable and is improved.

Although the above configuration is directed to the case of using both of the sublimation type recording and the melting type recording, it is apparent that the apparatus can also be used as a dedicated apparatus by fixing the recording method to one of those. Although in the above configuration the energizing pulse generating means 5 sets pulse widths for the respective gradation levels, it may set the number of pulses for each respective gradation level.

The number of sheet feeding operations is not limited to two, but may be three, four, or some other number. Further, although in the first embodiment "0" is used as masking data, small data such as "1" or "2" may employed as masking data, which provides advantages that the recording speed is increased and line image portions are improved in image quality.

Embodiment 3

Figure 18:
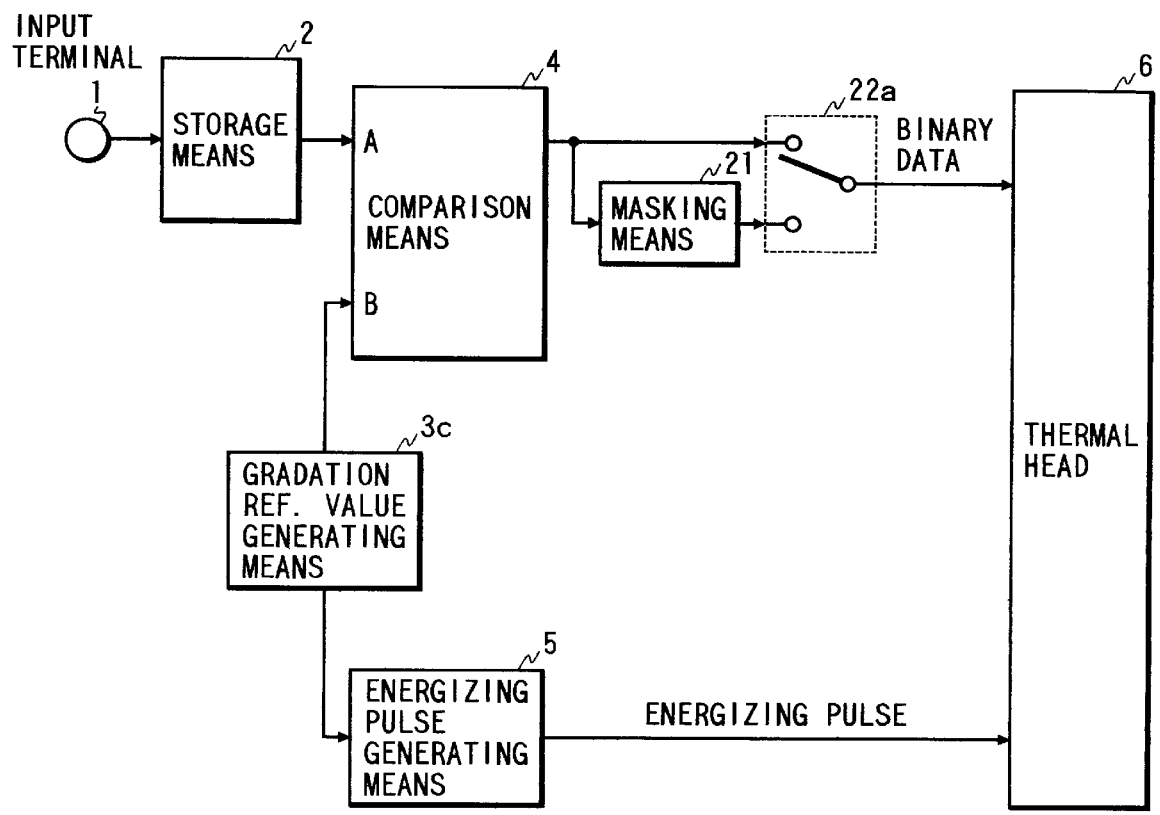
FIG. 18 is a functional block diagram showing a halftone recording apparatus according to a third embodiment of the invention.

A halftone recording apparatus that has a simpler configuration than the second embodiment can be constructed as shown in FIG. 18. In the halftone recording apparatus of FIG. 13, the redundant parts in FIG. 13 (the two gradation reference value generating means 3, comparison means 4 and energizing pulse generating means 5 provided in the gradation control means 7 and the odd/even control means 20) are combined into single parts.

In FIG. 18, in the sublimation type recording, a switching means 22a selects an output of a comparison means 4 and supplies it to the thermal head 6 as binary data. In the melting type recording, the switching means 22a selects an output of a masking means 21 and supplies masked data to the thermal head 6 as binary data.

Figure 19:
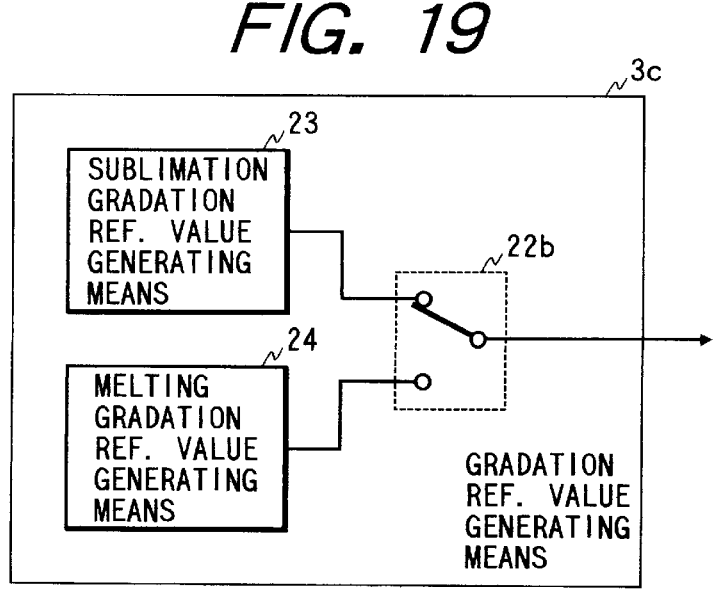
FIG. 19 is a functional block diagram showing a gradation reference value generating means in the third embodiment of the invention.

As shown in FIG. 19, a gradation reference value generating means 3c consists of sublimation gradation value generating means 23 for generating gradation reference values for the sublimation type recording (i.e., the gradation reference values of the first embodiment), a melting gradation reference value generating means 24 for generating gradation reference values for the melting type recording operation (i.e., gradation reference values of the second embodiment), and a switching means 22b for switching between outputs of the gradation reference value generating means 23 and 24. The switching means 22b operates in synchronism with the switching means 22a.

In the sublimation type recording, the switching means 22b of the gradation reference value generating means 3c selects the output of the sublimation reference value generating means 23, based on which energizing pulses are supplied to the thermal head 6. In the melting type recording operation, the switching means 22b selects the output of the melting reference value generating means 24, based on which energizing pulses are supplied to the thermal head 6.

To further simplify the apparatus, the sublimation gradation reference value generating means 23 and the melting reference value generating means 24 can be combined by using the same counter.

Although in the above embodiment the masking means 21 is provided downstream of the comparison means 4, it may be provided between the input terminal 1 and the storage means 2. The masking means 21 may be configured in any way as long as the odd-numbered and even-numbered heating resistors are caused to heat alternately.

Embodiment 4

The fourth embodiment of the invention will be described below.

In conventional halftone recording apparatuses, particularly in a sublimation type recording operation, burning sometimes occurs to produce a scorched recorded image. This phenomenon occurs when the temperature of heating resistors of the thermal head exceeds a certain level.

Figure 21:
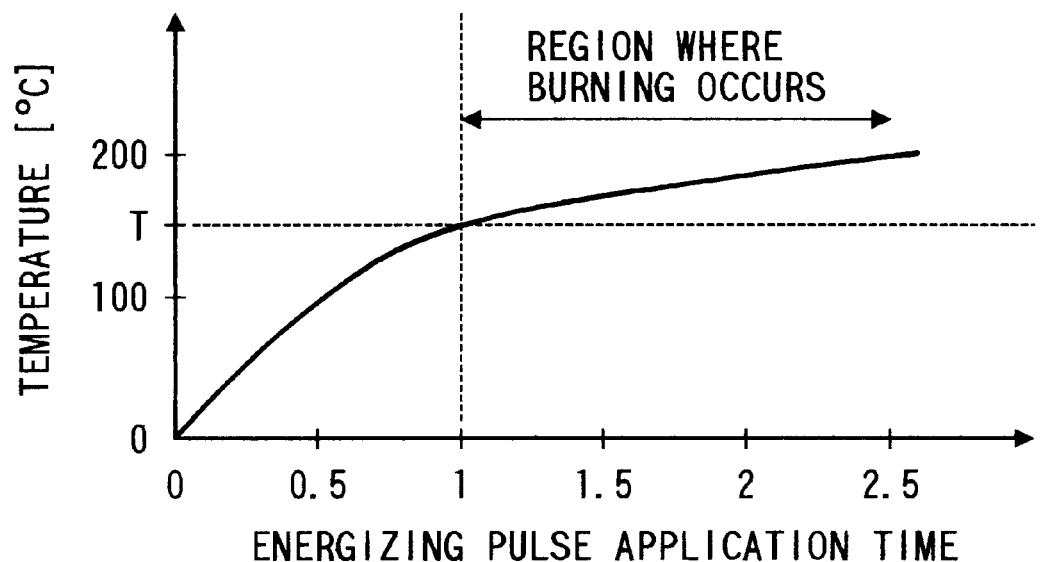
FIG. 21 is a graph showing a condition of burning occurrence.

FIG. 21 shows a relationship between the time during which energizing pulses are applied a heating resistor and its temperature. The horizontal axis of FIG. 21 represents the energizing pulse application time [ms] and the vertical axis represents the temperature [°C.] of a heating resistor of a thermal head. The temperature of the heating resistor monotonically increases with respect to the increase of the energizing pulse application time.

Actual measurements of the temperature of heating resistors with an infrared thermometer showed that burning occurred when the temperature exceeded T° C., which was between 100° and 200° C. Although the value of T varies depending on the shape of heating resistors of a thermal head, materials of an ink sheet and a recording sheet, and other factors, it generally fell in a range of 150° C. to 180° C. In the case of FIG. 21, the temperature exceeds T° C. when the energizing pulse application time exceeds 1 ms. This problem can be solved by inserting a cooling period after an energizing pulse of a gradation level corresponding to 1 ms is applied, to prevent the temperature from exceeding T° C.

Figure 20:
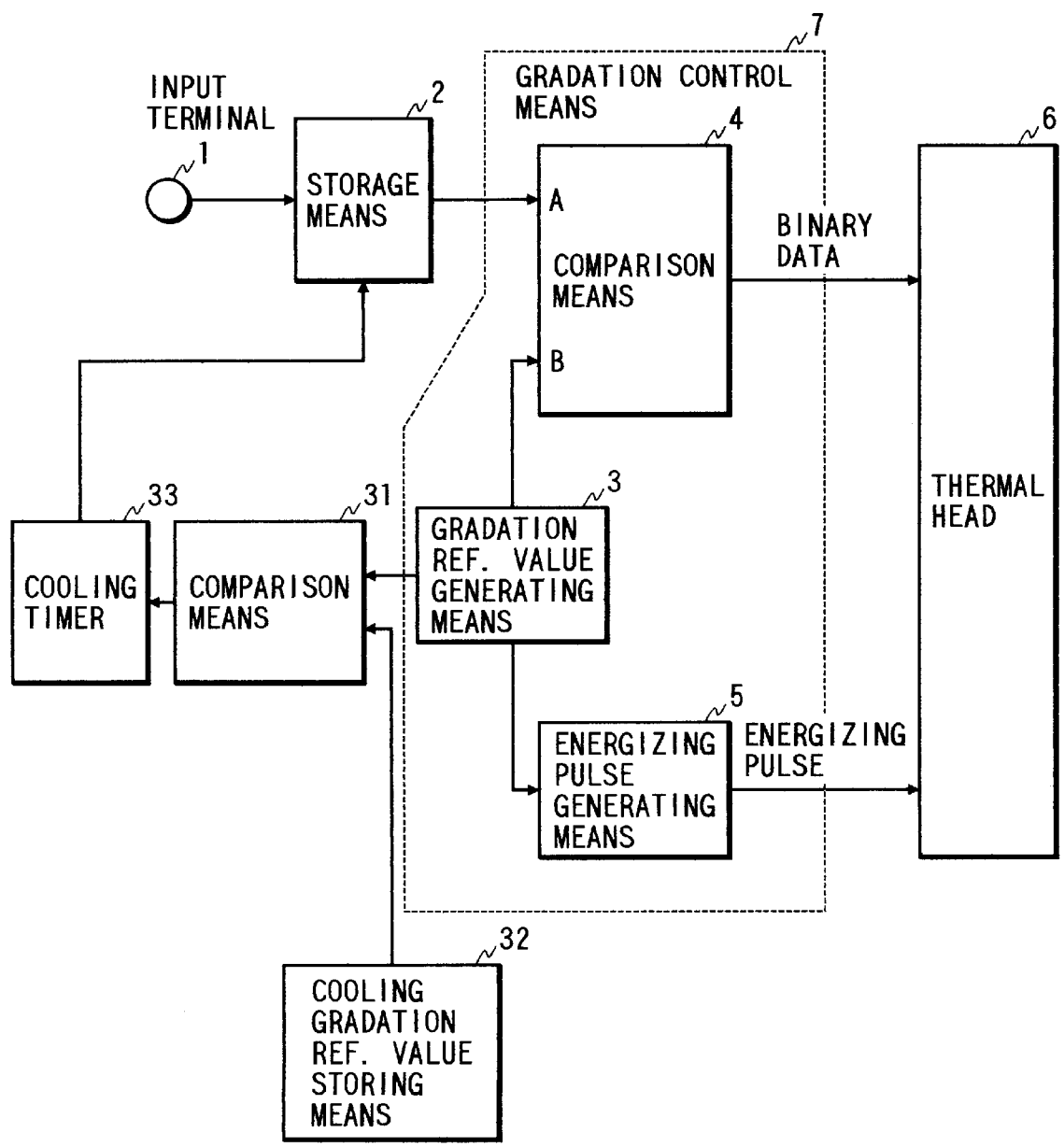
FIG. 20 is a functional block diagram showing a halftone recording apparatus according to a fourth embodiment of the invention.

The halftone recording method and apparatus according to the fourth embodiment will now be described with reference to the drawings. Referring to FIG. 20, an input terminal 1, a storage means 2, a gradation reference value generating means 3, a comparison means 4, an energizing pulse generating means 5, and a thermal head 6 are the same as or correspond to those shown in FIG. 1.

A comparison means 31 compares an output of the gradation reference value generating means 3 with an output value of a cooling gradation reference value storing means 32, which generates a gradation number that requests cooling based on a setting made by a CPU or the like (not shown). A cooling timer 33 suspends reading of gradation data from the storage means 2 for a predetermined period when the output of the comparison means 31 is "1."

A description will be made of how the above apparatus operates. The input terminal 1, storage means 2, gradation reference value generating means 3, comparison means 4, energizing pulse generating means 5, and thermal head 6 operate in the same manner as in the first embodiment.

The CPU or the like (not shown) sets the gradation number that requests cooling in the cooling gradation reference value storing means 32. The gradation number is determined based on experimental results as shown in FIG. 21, calculations, or the like. For example, cooling of the heating resistors are needed at the 100th and 151st gradation levels, "100" and "151" are set. Further, initial setting of, for instance, "100," which means a cooling period of 100 $\mu$s, is made in the cooling timer 33.

The output of the gradation reference value generating means 3 is input to the comparison means 31 as well as to the comparison means 4 and the energizing pulse generating means 5. The comparison means 31 compares the output of the gradation reference value generating means 3 with the gradation number that requests cooling. The comparison means 31 output "1" if they are equal to each other, and "0" if they are not. The cooling timer 33 starts counting only when the output of the comparison means 31 is "1," and supplies a read suspension signal to the storage means 2. As a result, the reading from the storage means 2 is suspended. The cooling timer 33 stops supplying the read suspension signal to the storage means 2 when its count has reached the initial setting value. In response, the reading from the storage means 2 is restarted and data is transferred to the comparison means. The ordinary operation is performed from that time on.

Figure 22:
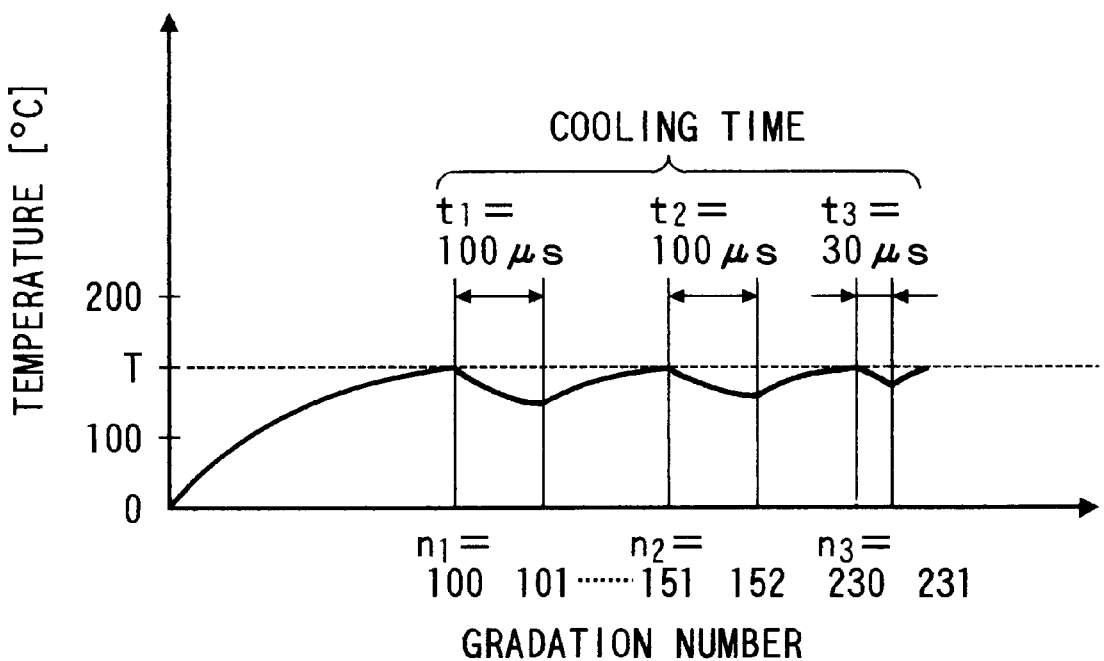
FIG. 22 is a graph showing a relationship between the timing of cooling and the temperature of a heating resistor in the fourth embodiment of the invention.

Assume a case where three values $n_1$=100, $n_2$=151, and $n_3$=230 are preset in the cooling gradation reference value storing means 32 as cooling gradation reference values that request cooling, and three cooling periods $t_1$=100, $t_2$=100, and $t_3$ that correspond to the respective cooling gradation reference values are preset in the cooling timer 33. FIG. 22 shows a relationship between the gradation number and the temperature of a heating resistor in this case. As shown in FIG. 22, cooling periods of 100 $\mu$s, 100 $\mu$s and 30 $\mu$s are inserted between the 100th and 101st gradation levels, between the 151st and 152nd gradation levels, and between the 230th and 231st gradation levels, respectively. Burning is prevented in this manner and high-quality images can be obtained.

Although the fourth embodiment is directed to the case of using the two recording operations as in the case of the first embodiment, the same effects can be obtained even in the case where a recording operation is performed only once per line. Further, higher quality images can be obtained if the CPU or the like sets the cooling gradation reference values and the values of the cooling timer 33 so that those values vary in the sheet feeding direction, i.e., with the line number. The fourth embodiment can be modified in any way as long as the cooling gradation numbers and the cooling timer are involved. For example, the fourth embodiment can be applied to the second embodiment or the fifth embodiment described below.

Embodiment 5

The fifth embodiment of the invention will be described below.

In the sublimation type or melting type halftone recording, the relationship between the gradation and the density or lightness is made linear by correcting the nonlinearity of the recording density (see FIG. 6) by means of the energizing pulses for the respective gradation levels. As a result, the widths or numbers of energizing pulses are different for the respective gradation levels. This makes it difficult to perform calculations relating to correction for resistance values, and requires a vast amount of table data to realize recording of high image quality.

The halftone recording method and apparatus according to the fifth embodiment provides a configuration that facilitates calculations, and thereby realize recording of high image quality with a small-sized circuit. More specifically, in contrast to the first embodiment in which the width of an energizing pulse is determined for each gradation level, in this embodiment the gradation data is converted to the number of energizing pulses (hereinafter referred to as an "energizing pulse level").

First, the principle of operation of the fifth embodiment will be described. Basically, the width of energizing pulses is fixed, gradation data is converted to an energizing pulse data that is larger than the gradation data (a gradation characteristic is improved), and the energizing pulse level is converted to binary data and energizing pulses of a constant width that correspond to respective bits of the binary data are output.

In contrast to the conventional table conversion method, the resistance correction, for instance, can be performed in the following manner. With a notation that R denotes an average resistance of the heating resistors; R', a resistance of a certain heating resistor; Y, an energizing pulse level before correction; V, an application voltage; and Y', an energizing pulse level after correction, the following relationship holds:

$$(V^2/R) \times Y = (V^2/R') \times Y' \qquad (1)$$

Therefore, the energizing pulse level after correction is calculated as $$Y' = (R'/R) \times Y. \qquad (2)$$

In Equation (2), R'/R serves as a correction coefficient. Therefore, the resistance correction can be performed by only a multiplier; that is, no conversion table nor like means is needed. Thus, the resistance correction can be performed by a simpler configuration than in the conventional case.

Figures 23, 24:
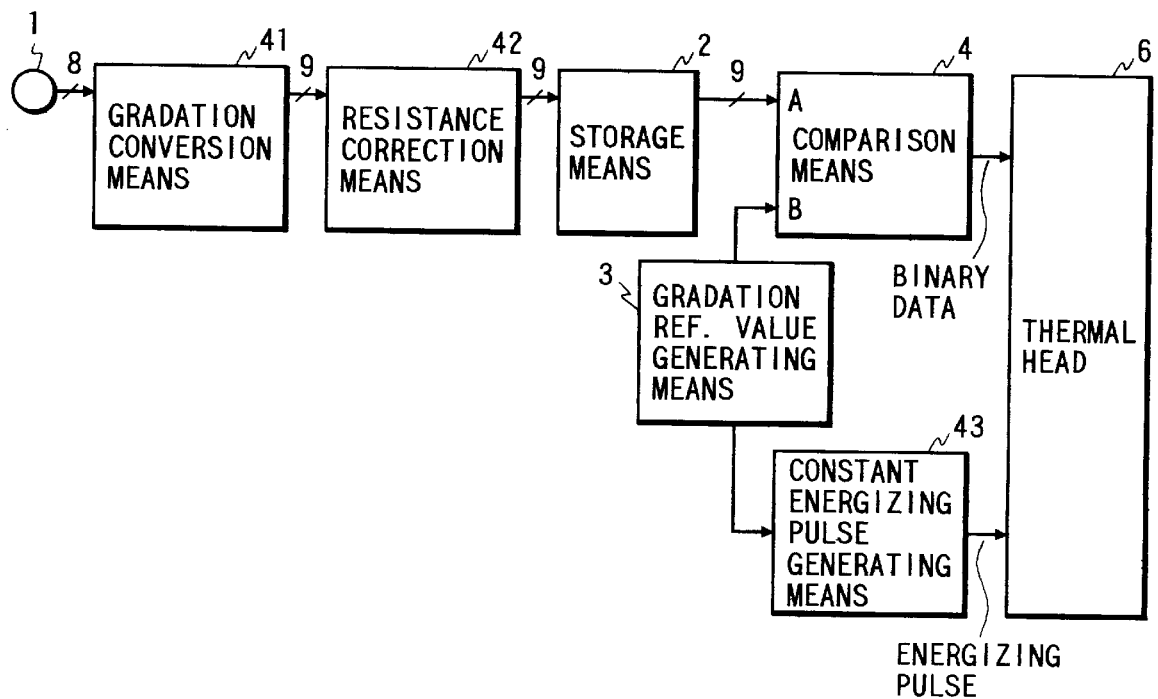
FIG. 23 is a functional block diagram showing a halftone recording apparatus according to a fifth embodiment of the invention.
FIG. 24 shows a relationship between input gradation data and an energizing pulse level in the fifth embodiment of the invention.

The fifth embodiment will be described with reference to the drawings. Referring to FIG. 23, a gradation conversion means 41 converts input gradation data that is input to an input terminal 1 to an energizing pulse level k (an integer of 3 or greater) that is larger than the input gradation level. A resistance correction means 42 corrects for a variation in resistances of heating resistors of a thermal head 6 based on an output of the gradation conversion means 41, and supplies corrected results to a storage means 2. A constant energizing pulse generating means 43 generates energizing pulses based on an output of the gradation reference value generating means 3.

The input terminal 1, storage means 2, gradation reference value generating means 3 and thermal head 6 are the same as those shown in FIG. 1, for instance.

A description will be made of how the above apparatus operates. As in the case of the first embodiment, 8-bit input gradation data (0–255) of one line are input to the input terminal 1, and then sequentially input to the gradation conversion means 41.

The gradation conversion means 41 stores in advance a table as shown in FIG. 24. According to the table of FIG. 24, input gradation data "1" and "253" are converted to energizing pulse levels of "20" and "292," respectively. The conversion from the input gradation data to the energizing pulse level performed by the gradation conversion means 41 is equivalent to conversion from the input gradation data to the number of constant energizing pulses. In this example, input gradation data "1" is converted to an energizing pulse level for outputting 20 constant-width energizing pulses (described later). Since the converted energizing pulse level may be data larger than 255, the output of the gradation conversion means 41 is 9-bit data.

The relationship between the input gradation data and the energizing pulse level is predetermined by an experiment or a calculation so as to provide a substantially linear relationship between the gradation and the recording density.

Figure 25:
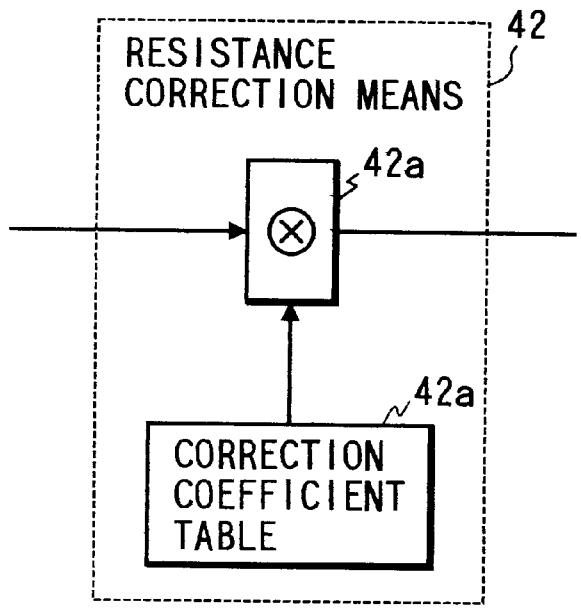
FIG. 25 is a functional block diagram showing a resistance correction means in the halftone recording apparatus of the fifth embodiment of the invention.

The output of the gradation conversion means 41 is input to the resistance correction means 42. For example, as shown in FIG. 25, the resistance correction means 42 consists of a correction coefficient table 42b that stores in advance correction coefficients of one line corresponding to the respective heating resistances of the thermal head 6, and a multiplier 42a for multiplying an energizing pulse level that is output from the gradation conversion means 41 by a correction coefficient that is output from the correction conversion table 42b. The correction coefficient corresponds to R'/R in Equation (2). The multiplier sequentially multiplies the energizing pulse levels by the correction coefficients according to Equation (2), and supplies multiplied results to the storage means 2. The storage means 2 stores those data.

The gradation data corresponding to the 1st to 1,280th heating resistors of the thermal head 6 are sequentially read from the storage means 2, and input to a comparison means 4. The comparison means 4 compares those gradation data with a gradation reference value "1" generated by the gradation reference value generating means 3. The comparison means 4 outputs binary data "1" if the energizing pulse level is larger than or equal to the gradation reference value, and "0" if the former is smaller than the latter. The binary data thus produced for each heating resistor is transferred to the thermal head 6 in synchronism with a thermal head clock signal (not shown).

On the other hand, the gradation reference value that is output from the gradation reference value generating means 3 is also input to the constant energizing pulse generating means 43. The constant energizing pulse generating means 43 supplies a constant-width energizing pulse p (an integer of 0 or larger) every time a gradation reference value is generated. Although the width of the energizing pulses depends on the characteristics of a thermal head and the characteristics of a recording medium, it is usually set at about 10 μs.

Then, the energizing pulse levels of one line are again read from the storage means 2 by an address generating means (not shown) and, at the same time, a gradation reference value "2" is output from the gradation reference value generating means 3. In a manner similar to the above, the comparison means 4 converts the gradation data to binary data by comparing those with the gradation reference value, and supplies the binary data to the thermal head 6. At the same time, the constant energizing pulse generating means 43 outputs constant-width energizing pulses p.

The comparison means 4 and the constant energizing pulse generating means 43 operate in a manner similar to the above for gradation reference values 3, 4, 5, . . . , 298.

Figure 26:
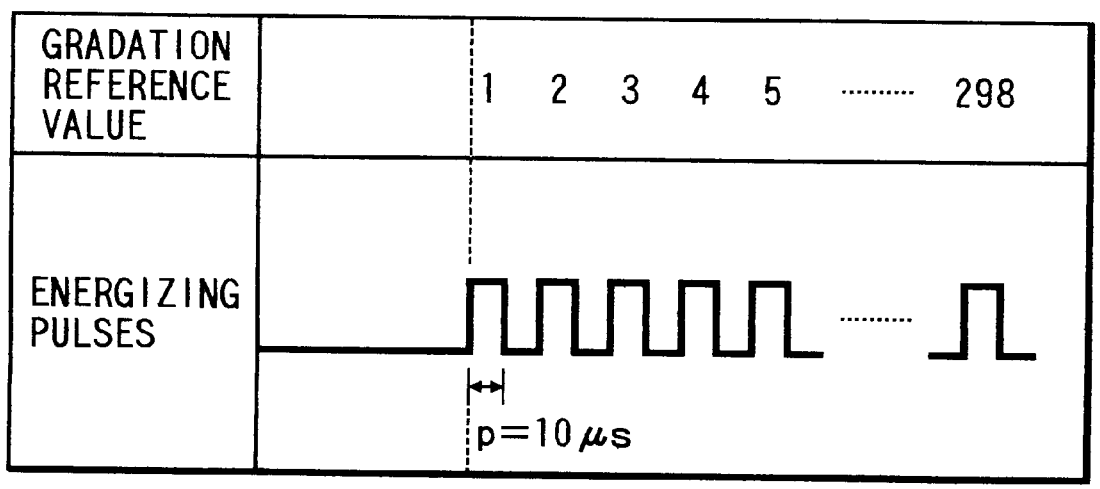
FIG. 26 shows a relationship between gradation reference values and energizing pulses in the fifth embodiment of the invention.

FIG. 26 shows the energizing pulses that are generated in the above manner. The total number of energizing pulses is 298, which is equal to the maximum output value of the gradation conversion means 41.

Assume that the input gradation level for a certain pixel is "1." This level is converted by the gradation conversion means 41 to an energizing pulse level "20," which is then converted to, for instance, "21" by the resistance correction means 42. Since the comparison means 4 operates in the same manner as in the first embodiment, it outputs 21 consecutive 1's and 277 (=298−21) 0's. Therefore, the 1st to 21st energizing pulses are applied to a heating resistor corresponding to the pixel concerned having the input gradation level "1." Similarly, a heating resistor corresponding to a pixel having an input gradation level "2" receives {(correction coefficient)×32} energizing pulses, and a heating resistor corresponding to a pixel having an input gradation level "3" receives {(correction coefficient)×41} energizing pulses. The same thing applies to the other input gradation levels.

A two-dimensional image can be obtained by performing the above operation for one image, and the recording is completed.

Although the fifth embodiment is directed to the case of using the resistance correction means 42 for correcting for a variation in resistances of the respective heating resistors, a correction means for correcting a voltage drop that occurs due to a difference of a common resistance of the thermal head 6. Further, the two correction means may be used in combination, which configuration is more advantageous because tables of the correction means can be reduced.

In addition, the order of the gradation conversion means 41, resistance correction means 42 and storage means 3 is not limited to the one shown in FIG. 23, but may be changed so as to be arranged in the order of the resistance correction means 41, storage means 2 and gradation correction means 41. It is further noted that no limitation is imposed on the kind of correction means etc. and the kind of recording head.

Embodiment 6

The sixth embodiment of the invention will be described below.

The conventional halftone recording apparatuses have a problem that when the number of gradation levels is increased to realize recording of high image quality, the number of times of data transfer to the thermal head is increased and the recording speed is thereby reduced. The sixth embodiment is intended to solve this problem, and realizes high-speed recording by driving a thermal head by combining energizing pulses having a constant width p and an auxiliary energizing pulse having a narrower width q.

Figures 28, 29:
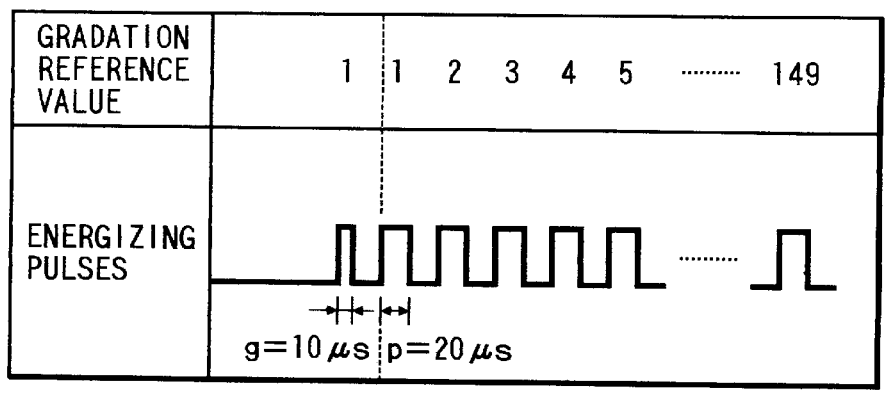
FIG. 28 shows a relationship among an energizing pulse level, energizing pulses p, and an auxiliary energizing pulse q in the sixth embodiment of the invention.
FIG. 29 shows a relationship between gradation reference values and the (auxiliary) energizing pulses in the sixth embodiment of the invention.

More specifically, the ratio between the width p of the energizing pulses and the width q of the auxiliary energizing pulse is set at about 2:1, and the (auxiliary) energizing pulses are generated as showing in FIG. 29 based on a corresponding relationship among the energizing pulse level, the energizing pulses, and the auxiliary energizing pulse shown in FIG. 28. The (auxiliary) energizing pulses shown in FIG. 29 are made up of 149 energizing pulses having the constant width p and one auxiliary energizing pulse having the width q that precedes the 149 energizing pulses. The (auxiliary) energizing pulses of FIG. 29 are of a fixed pattern.

The values in the column of the energizing pulses p of FIG. 28 determine the number of pulses to be applied and the number of pulses to be masked among the constant-width energizing pulses shown in FIG. 29. The values in the column of the auxiliary energizing pulses q of FIG. 28 determine whether the auxiliary energizing pulse shown in FIG. 29 should be masked. For example, when the energizing pulse level is "4," no auxiliary energizing pulse is output (i.e., masking is effected) because the value in the column of the auxiliary energizing pulse q is 0, and two constant-width energizing pulses are output (i.e., 147 (=149−2) pulses are masked) because the value in the column of the energizing pulses p is 2. When the energizing pulse level is "13," one auxiliary energizing pulse is output (masking is not effected) because the value in the column of the auxiliary energizing pulse is 1, and 6 constant-width energizing pulses are output (i.e., 143 (=149−6) pulses are masked) because the value in the column of the energizing pulses p is 6. In this manner, a desired density is obtained by a combination of the energizing pulses and the auxiliary energizing pulse.

Figure 30:
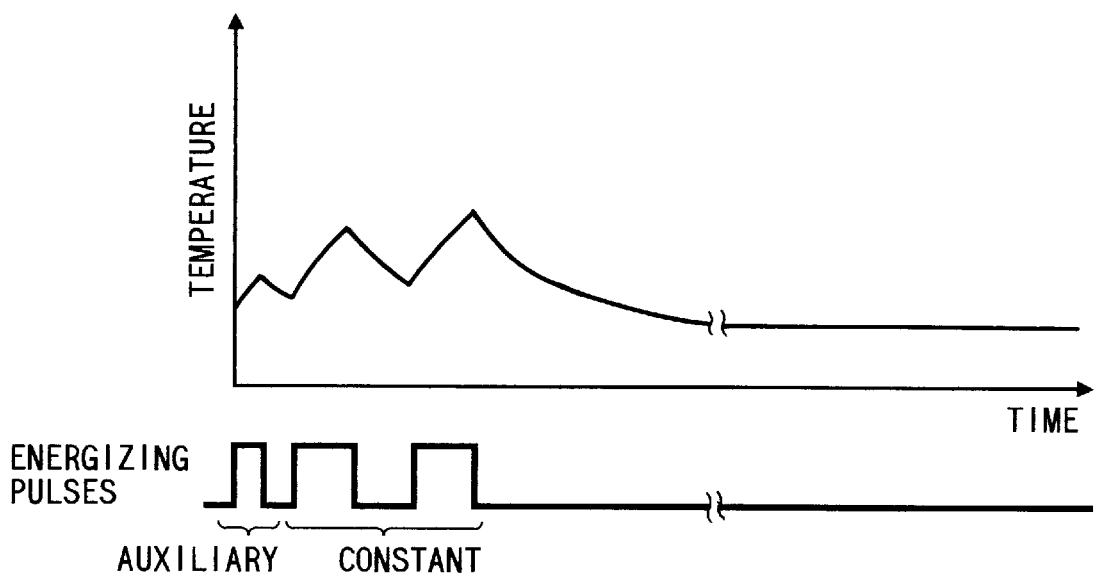
FIGS. 30 and 31 are graphs each showing a relationship between (auxiliary) energizing pulses and a temperature waveform of a heating resistor in the sixth embodiment of the invention.
Figure 31:
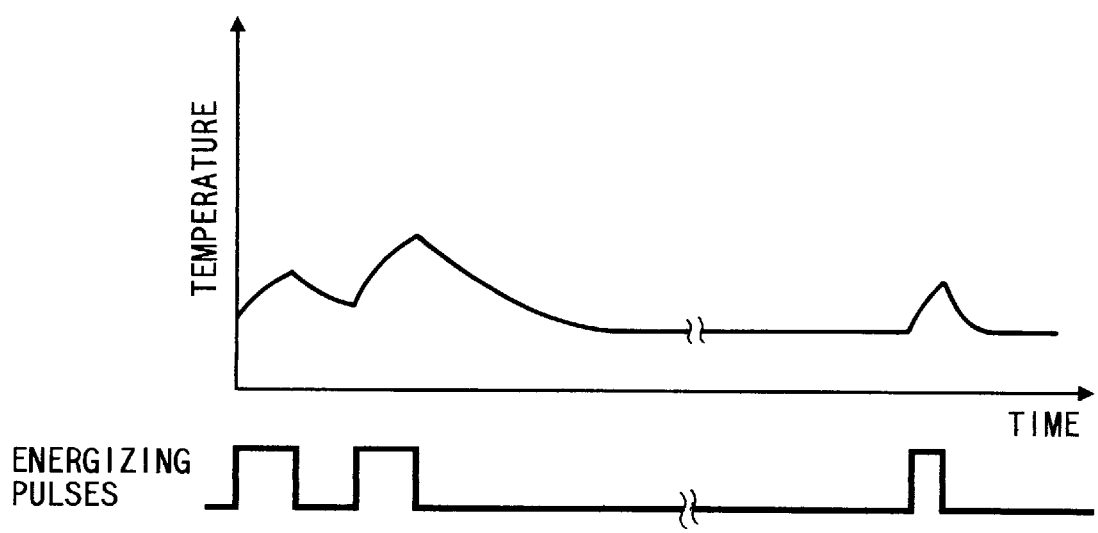

As for the order of the constant-width energizing pulses and the auxiliary energizing pulse, it has been concluded that stable image quality can be obtained when the constant-width energizing pulses follow the auxiliary energizing pulse as shown in FIG. 29. This will be explained with reference to FIGS. 30 and 31, each of which shows a relationship between (auxiliary) energizing pulses and a temperature waveform. FIG. 30 shows how the temperature of a heating resistor varies in time when constant-width energizing pulses are output after output of an auxiliary energizing pulse. FIG. 31 shows how the temperature of a heating resistor varies in time when an auxiliary energizing pulse is output after output of constant-width energizing pulses.

In the case of FIG. 30, the condition of temperature increase is kept constant because the auxiliary energizing pulse is located before the constant-width energizing pulses. In contrast, in the case of FIG. 31, the influence of the auxiliary energizing pulse depends on the energizing pulse level. For example, if the energizing pulse level is small, say, "4," the auxiliary energizing pulse is output in a state that a heating resistor is cooled and its temperature has returned to the initial temperature. Therefore, as shown in the temperature waveform of FIG. 31, the influence of the auxiliary energizing pulse is relatively small. On the other hand, if the energizing pulse level is large, say, "255," the auxiliary energizing pulse is output before the temperature of a heating resistor returns to the initial temperature. Therefore, the influence of the auxiliary energizing pulse is relatively large, to produce a density that is higher than an expected value. Thus, where an auxiliary energizing pulse is output after output of constant-width energizing pulses, the influence of the auxiliary energizing pulse depends on the energizing pulse level, so that stable image quality cannot be obtained.

Figure 27:
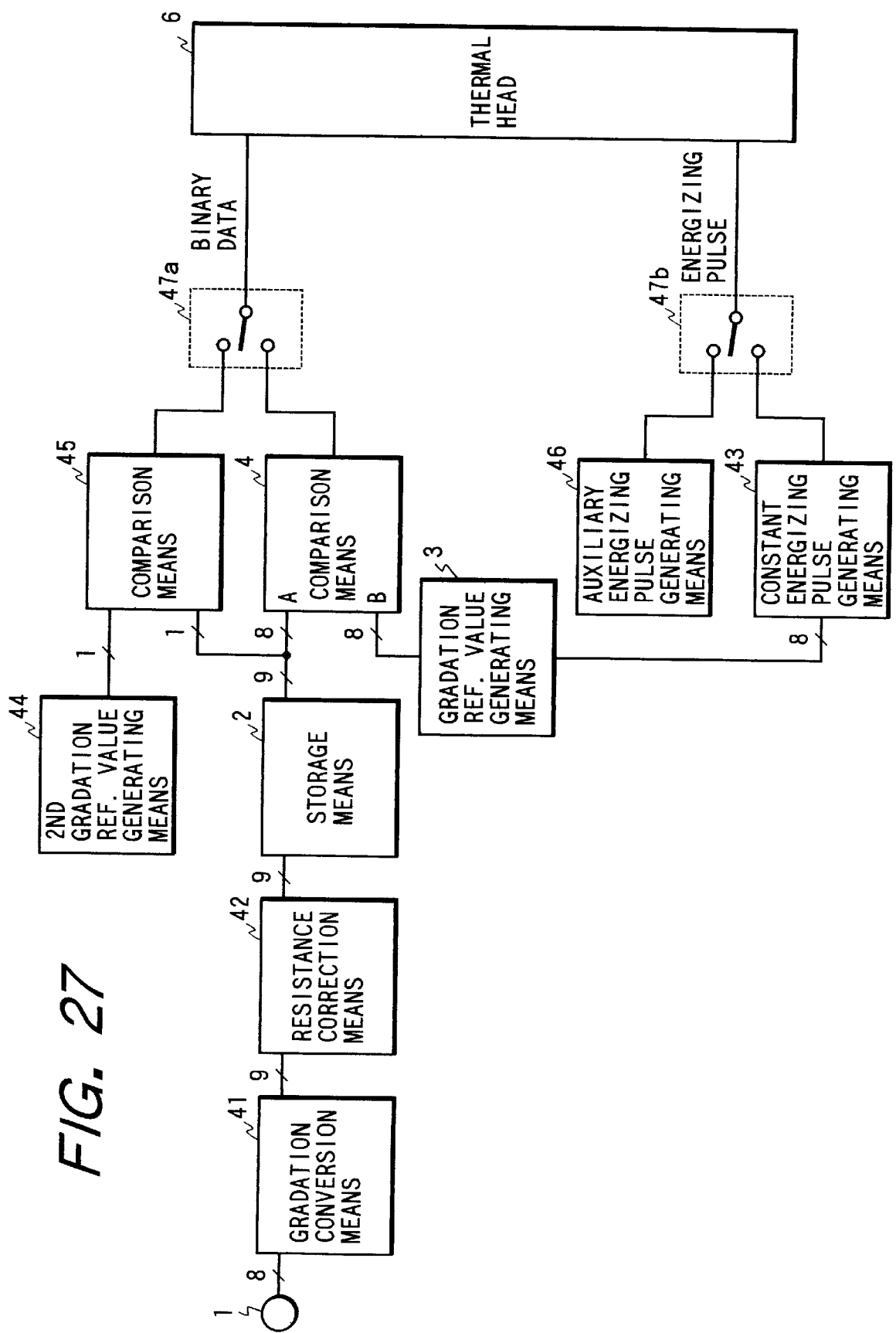
FIG. 27 is a functional block diagram showing a halftone recording apparatus according to a sixth embodiment of the invention.

The halftone recording method and apparatus according to the sixth embodiment of the invention will be described with reference to the drawings. Referring to FIG. 27, a second gradation reference value generating means 44 generates a gradation reference value "1." A comparison means 45 compares an output of the second gradation reference value generating means 44 and the LSB of 9-bit data, i.e., an energizing pulse level that is an output of a storage means 2. The comparison means outputs "1" if the LSB is larger than or equal to the gradation reference value, and "0" if the LSB is smaller than the gradation reference value. A selector 47a selects an output of the comparison means 45 or an output of a comparison means 4. An auxiliary energizing pulse generating means 46 generates an auxiliary energizing pulse having a width of 10 μs, for instance. A selector 47b selects the auxiliary energizing pulse that is output from the auxiliary energizing pulse generating means 46 or an energizing pulse that is output from a constant energizing pulse generating means 43.

The other components in FIG. 27 are the same as or correspond to those in the fifth embodiment. The width of the constant-width energizing pulses that are output from the constant energizing pulse generating means 43 is 20 μs, for instance.

A description will be made of how the above apparatus operates. First, the selectors 47a and 47b are so set as to select the output of the comparison means 45 and the output of the auxiliary energizing pulse generating means 46, respectively. Therefore, the auxiliary energizing pulse is output first. Input gradation data of one lines are converted by a gradation conversion means 41, corrected by a resistance correction means 42, and sequentially stored into storage means 2. When the energizing pulse levels are sequentially read from the storage means 2, the LSBs of those data are compared with the output "1" of the second gradation reference value generating means 44, and comparison results are transferred to a thermal head 6 via the selector 47a.

Then, the selector 47a is so set as to select the output of the comparison means 4. The energizing pulse levels are again read from the storage means 2, and "1" is output from the gradation reference value generating means 3. The comparison means 4 compares the higher 8 bits of the energizing pulse levels with the output of the gradation reference value generating means 3. Comparison results are transferred to the thermal head 6 via the selector 47b. At the same time, the auxiliary energizing pulse generating means 46 transfers the auxiliary energizing pulse to the thermal head 6 via the selector 47b.

As described above, since the auxiliary energizing pulse q is not masked when the value in the column of the auxiliary energizing pulse q in FIG. 28 is "1," it is applied to corresponding heating resistors. On the other hand, when the value in the column of the auxiliary energizing pulse q is "0," it is masked and is not applied to corresponding heating resistors.

Then, the selector 47b is so set as to select the output of the constant energizing pulse generating means 43. The gradation reference value generating means 3 generates a gradation reference value "2," and the comparison means 4 compares this gradation reference value with the higher 8 bits of the energizing pulse levels. Comparison results are transferred to the thermal head 6 via the selector 47a. On the other hand, the constant energizing pulse generating means 43 transfers the energizing pulse p to the thermal head 6 via the selector 47b. The similar operation is performed for the other gradation reference values 3, 4, . . .

The recording of one line is finished by feeding a sheet by one pitch after the operations for all the gradation reference values (1, 2, 3, . . . , 298) have been completed. By repeating such a 1-line operation, a two-dimensional image is obtained.

Although in the sixth embodiment the second gradation reference value generating means 44 and the gradation reference value generating means 3 are provided separately and the comparison means 4 and 45 are also provided separately, they may be combined into single parts to eliminate the selector 47a. Further, the auxiliary energizing pulse generating means 46 and the constant energizing pulse generating means 43 may be combined into a single energizing pulse generating means to eliminate the selector 47b. The same effects as in the sixth embodiment can be obtained by either modification.

Embodiment 7

Figure 32:
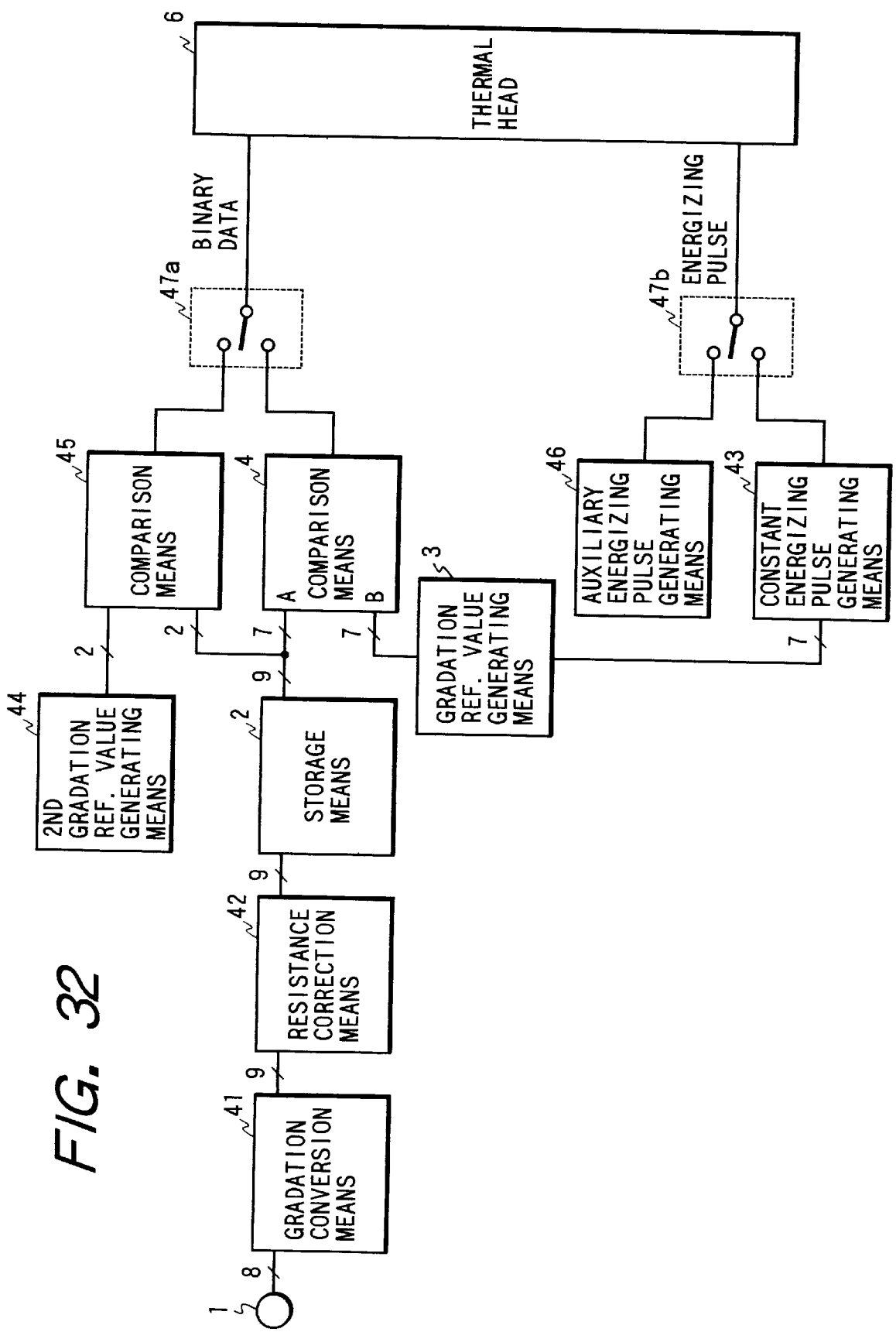
FIG. 32 is a functional block diagram showing a halftone recording apparatus according to a seventh embodiment of the invention.

To further increase the recording speed from that of the apparatus of the sixth embodiment, a halftone recording apparatus shown in FIG. 32 has been conceived in which a plurality of (for instance, 3) auxiliary energizing pulses and constant-width energizing pulses are combined.

Figures 33, 34:
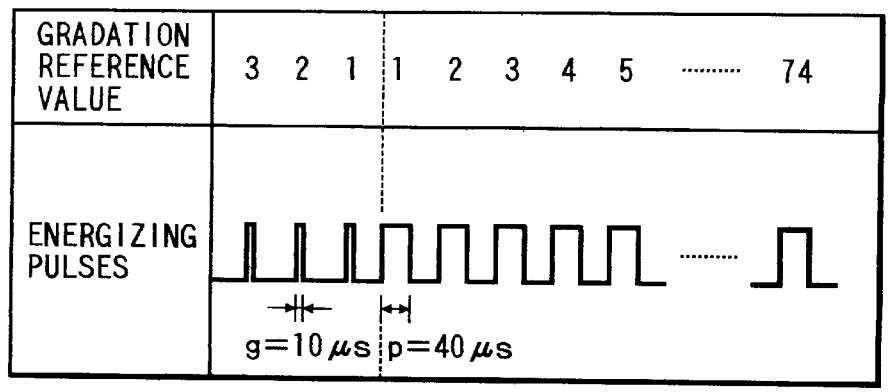
FIG. 33 shows a relationship among an energizing pulse level, energizing pulses p, and auxiliary energizing pulses q in the seventh embodiment of the invention.
FIG. 34 shows a relationship between gradation reference values and the (auxiliary) energizing pulses in the seventh embodiment of the invention.
Figure 35:
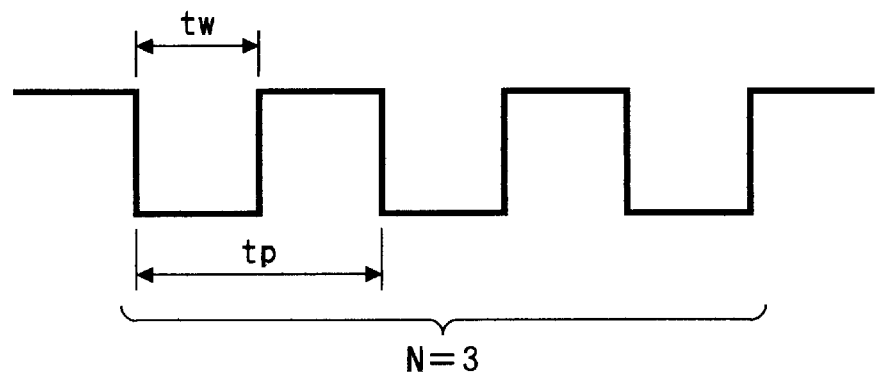
FIG. 35 is a waveform diagram of energizing pulses in a conventional halftone recording method.
Figure 36:
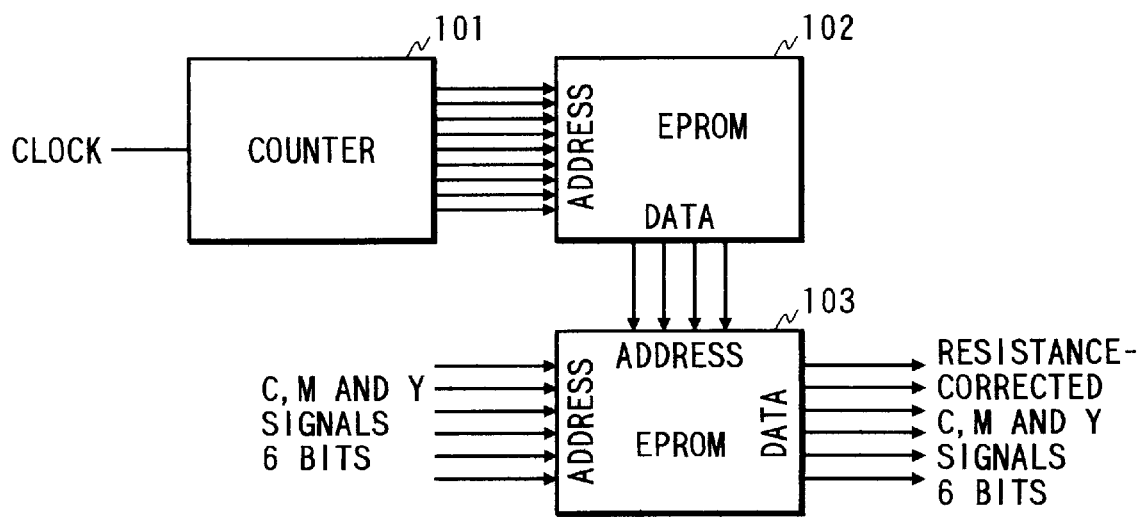
FIG. 36 is a functional block diagram of a conventional resistance correcting means.

More specifically, the ratio between the width of the auxiliary energizing pulses and the width of the constant-width energizing pulses is set at 1:4, and a relationship among the energizing pulse level, the energizing pulses p, and the auxiliary energizing pulses q is set as shown in FIG. 33. With these settings, even 256-gradation recording can be performed with 3 auxiliary energizing pulses and 73 constant-width energizing pulses (i.e., 76 pulses in total). For example, when the gradation data is 255 (the energizing pulse level is 298), two auxiliary energizing pulses and 74 constant-width energizing pulses (76 pulses in total) are output as seen from FIG. 33. That is, the number of output pulses is approximately half of that of the sixth embodiment. Thus, this embodiment can further increase the recording speed.

FIG. 32 shows a configuration of the halftone recording apparatus of the seventh embodiment. This configuration is different from the configuration of the sixth embodiment in the following points. First, an output of a storage means 2 is divided into the lower 2 bits and the higher 7 bits, which are supplied to comparison means 45 and 4, respectively. Second, a second gradation reference value generating means 44 outputs "3," "2" and "1" in this order in the form of data having a 2-bit structure in contrast to the case of the sixth embodiment in which only "1" is output. Third, the comparison means 45 performs a comparing operation of 2 bits, and a gradation reference value generating means 3 outputs 7-bit value. Even with those differences, the apparatus of the seventh embodiment operates approximately in the same manner as the sixth embodiment.

First, the second gradation reference value generating means 44 sequentially outputs gradation reference values "3," "2" and "1," based on which masking on the three auxiliary energizing pulses (see FIG. 34) is controlled. For example, when the energizing pulse level is "1," the comparison means 45 supplies binary data to a thermal head 6 so as to mask the auxiliary energizing pulses other than "1", i.e., to mask the auxiliary energizing pulses "2" and "3" (see FIG. 34). Similarly, when the energizing pulse level is "2," the comparison means 45 supplied binary data to the thermal head 6 so as to mask the auxiliary energizing pulse "3" (see FIG. 34). When the energizing pulse level is "3," no auxiliary energizing pulse is masked. On the other hand, when the energizing pulse level is "0," all the auxiliary energizing pulses are masked.

After the processing on the auxiliary energizing pulses is completed, a gradation reference value generating means 3 generates gradation reference values 1, 2, 3, . . . , 74. Subsequently, the apparatus operates in the same manner as in the sixth embodiment.

In the sixth and seventh embodiments, the ratio between the width of the constant-width energizing pulses and the width of the auxiliary energizing pulses is set at $2^m:1$. The parameter m is equal to 1 in the sixth embodiment, and 2 in the seventh embodiment. The ratio $2^m:1$ is employed to facilitate calculations and to increase the recording speed. The parameter m may be any integer of 1 or larger. However, if m is larger than 8, the gradation characteristics are degraded though the recording speed is increased. It is preferred that m be 2 or smaller when priority is given to the image quality, and that m be 4 or larger when priority is given to the recording speed.

Although the first to seventh embodiments are directed to the halftone recording apparatuses using a thermal recording head such as a thermal head, the invention is not limited to such a case, but it goes without saying that the first and seventh embodiments can also be applied to an ink-jet type apparatus, an electrophotographic apparatus, and other apparatuses. In the latter cases, the thermal head is replaced by an ink-jet head, a laser head, or the like. In short, the invention can be applied to any halftone recording apparatus using a recording head capable of changing the density in accordance with a control signal; for instance, a recording head that changes the density of a recording portion itself in accordance with the number of energizing pulses, or a recording head that changes the area of a recording portion.

The halftone recording methods and apparatuses of the first and seventh embodiments can be applied not only to a printer but also to electrophotographic apparatuses such as a facsimile machine and a copier, and other image recording apparatuses.

As described above, according to the invention, in a halftone recording method for performing recording onto a recording sheet with a plurality of gradation levels while moving the recording sheet, a plurality of sheet feeding operations are performed for one line, and recording operations are performed in a dispersive manner based on gradation data that are different for the respective sheet feeding operations. Therefore, horizontal streaks can be prevented and recording of high image quality can be realized even for characters and a line drawing.

Where there is provided gradation control means for changing a corresponding relationship between the sheet feeding operations and the recording operations every line or every predetermined lines, the image quality can further be improved.

According to another aspect of the invention, there is provided a halftone recording apparatus comprising sheet feeding means for moving a recording sheet; a recording head having a plurality of heating resistors for performing recording onto the recording sheet with a plurality of gradation levels; gradation control means for controlling the sheet feeding means so that the sheet feeding means performs a plurality of sheet feeding operations for one line, and for controlling the recording head so that the recording head performs recording operations in a dispersive manner based on gradation data that are different for the respective sheet feeding operations; recording control means for controlling the thermal head so that a different part of the heating resistors are caused to heat for each of the sheet feeding operations so that an interval between adjacent recorded portions are wider than an interval of adjacent ones of the heating resistors; and switching means for selectively supplying outputs of the gradation control means and outputs of the recording control means to the recording head. This configuration realizes improved image quality for each of the different types of recording operations.

Where the length of each of the heating resistors in the auxiliary scanning direction is 0.6 to 1.7 times the width of each of the heating resistors in the main scanning direction, the image quality can further be improved.

Where straight lines connecting recorded portions form an angle $\theta$ of 10° to 35°, the image quality can further be improved.

According to another aspect of the invention, there is provided a halftone recording apparatus comprising a recording head for performing recording onto a recording sheet with a plurality of gradation levels; cooling reference storing means for storing a cooling timing in advance; and a cooling timer for suspending the recording of the recording head for a predetermined period at the stored cooling timing. With this configuration, burning of a recording sheet can be prevented, contributing to improvement of the image quality.

According to still another aspect of the invention, there is provided a halftone recording apparatus comprising a recording head for performing recording onto a recording sheet with n gradation levels, where n is an integer not smaller than 2; gradation conversion means for converting external input gradation data to an energizing pulse level k that is larger than n-1, where k is an integer not smaller than 3; gradation reference value generating means for generating a gradation reference value; comparison means for comparing the gradation reference value with the energizing pulse level to generate comparison data, and supplying the comparison data to the recording head; and constant energizing pulse generating means for supplying energizing pulses having a constant width p to the recording head to cause the recording head to perform the recording based on the comparison data. This configuration realizes recording of high image quality while reducing the size of the recording apparatus.

The above halftone recording apparatus may further comprise auxiliary energizing pulse generating means for supplying an auxiliary energizing pulse having a width q that is smaller than p; and auxiliary energizing pulse comparing means for enabling or disabling the auxiliary energizing pulse based on the energizing pulse level. This configuration provides an advantage of increased processing speed.

Where the auxiliary energizing pulse generating means outputs the auxiliary energizing pulse before the energizing pulses having the constant width p, the image quality can further be improved.

Where the ratio between the width p and the width q is approximately equal to $2^m:1$, where m is an integer of 1 or larger, the recording speed as well as the image quality can be improved.

What is claimed is:

1. A halftone recording method for recording a data line as a plurality of gradation levels onto a recording sheet by a recording head while moving said recording sheet, said recording head including a plurality of recording elements arranged in a main scanning direction, said method comprising steps of:

performing a plurality of sheet feeding operations, in an auxiliary scanning direction, for each data line; and performing a corresponding plurality of recording operations based on gradation data representing the plurality of gradation levels for each data line, each of said recording operations enabling all of said plurality of recording elements of said recording head for selective printing, said recording operations being dispersed in said auxiliary scanning direction such that the gradation levels for each recording operation are different.

2. The halftone recording method of claim 1, wherein the step of performing a plurality of sheet feeding operations includes the step of:

performing two sheet feeding operations for each data line.

3. A halftone recording apparatus comprising:

a recording head including a plurality of recording elements arranged in a main scanning direction for recording a data line as a plurality of gradation levels onto said recording sheet;

sheet feeding means for moving said recording sheet in an auxiliary scanning direction; and gradation control means for controlling said sheet feeding means so that said sheet feeding means performs a plurality of sheet feeding operations for each data line, and for controlling said recording head so that said recording head performs a plurality of recording operations corresponding to said plurality of sheet feeding operations based on gradation data representing said gradation levels for each data line, each of said recording operations enabling all of said plurality of recording elements of said recording head for selective printing, said recording operations being dispersed in said auxiliary scanning direction such that the gradation levels for each recording operation are different.

4. The method of claim 3, wherein said gradation control means includes, gradation reference value generating means for generating gradation reference values that are different for each of said sheet feeding operations corresponding to a data line, comparison means for making a comparison, for each of said sheet feeding operations, of respective gradation reference values with said gradation data and enabling or disabling said recording head based on a predetermined criterion for said comparison, and energizing pulse generating means for supplying energizing pulses to said recording head to effect said recording operations.

5. The halftone recording apparatus according to claim 4, wherein said gradation reference value generating means includes:

a plurality of counters; and means for selecting a sequence of outputs from said plurality of counters as said gradation reference values.

6. The halftone recording apparatus according to claim 4, wherein said gradation reference value generating means includes:

a table containing said gradation reference values; and means for accessing said table to retrieve said gradation reference values.

7. The halftone recording apparatus according to claim 4, wherein a width of said energizing pulses is based upon said gradation reference values.

8. The halftone recording apparatus according to claim 4, wherein a number of said energizing pulses is based upon said gradation reference values.

9. The halftone recording apparatus according to claim 4, wherein the number of said sheet feeding operations for each data line is two.

10. A halftone recording apparatus comprising:

sheet feeding means for moving a recording sheet;

a recording head for recording a data line as a plurality of gradation levels onto said recording sheet; and gradation control means for controlling said sheet feeding means so that said sheet feeding means performs a plurality of sheet feeding operations for each data line, and for controlling said recording head so that said recording head performs a plurality of recording operations corresponding to said plurality of sheet feeding operations based on gradation data representing said gradation levels for each data line in a dispersive manner, wherein said gradation control means changes a corresponding relationship between said sheet feeding operations and said recording operations for different data lines.

11. A halftone recording method for recording a data line onto a recording sheet by a recording head as a plurality of gradation levels while moving said recording sheet, said method comprising the steps of:

performing a plurality of sheet feeding operations each data line; and performing a corresponding plurality of recording operations based on gradation data representing a plurality of gradation levels for each data line in a dispersive manner;

said step of performing a plurality of recording operations including the steps of, generating a set of gradation reference values which is different for each of said sheet feeding operations;

generating a plurality of energizing pulses to effect said recording operations;

making a comparison of said gradation data and said gradation reference values;

enabling or disabling said recording head based on a predetermined criterion for said comparison; and effecting one of said sheet feeding operations at the completion of said recording operations corresponding to said set of gradation reference values.

12. The halftone recording method according to claim 11, wherein the step of generating a set of gradation reference values includes the step of:

selecting a sequence of outputs from a plurality of counters as said gradation reference values.

13. The halftone recording method according to claim 11, wherein the step of generating a set of gradation reference values includes the step of:

accessing a table containing said gradation reference values to retrieve said gradation reference values.

14. The halftone recording method according to claim 11, wherein the step of generating a plurality of energizing pulses includes the step of:

selecting a width of said energizing pulses based upon said gradation reference values.

15. The halftone recording method according to claim 11, wherein the step of generating a plurality of energizing pulses includes the step of:

selecting a number of said energizing pulses based upon said gradation reference values.

16. A halftone recording method for recording a data line onto a recording sheet by a recording head as a plurality of gradation levels while moving said recording sheet, said method comprising the steps of:

performing a plurality of sheet feeding operations for each data line;

performing a corresponding plurality of recording operations based on gradation data representing a plurality of gradation levels for each data line in a dispersive manner; and changing a corresponding relationship between said sheet feeding operations and said recording operations for different data lines.

* * * * *